United States Patent
Baumgartner et al.

(10) Patent No.: US 6,542,086 B2
(45) Date of Patent: Apr. 1, 2003

(54) DOCKING SYSTEM FOR AIRPORT TERMINALS

(75) Inventors: Klaus Baumgartner, Stutensee (DE); Martin Brennfleck, Stutensee (DE); John Konerth, Munich (DE); Norbert Link, Karlsruhe (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/755,096

(22) Filed: Jan. 8, 2001

(65) Prior Publication Data

US 2002/0030609 A1 Mar. 14, 2002

Related U.S. Application Data

(63) Continuation-in-part of application No. 09/533,245, filed on Mar. 22, 2000, now abandoned, which is a continuation of application No. PCT/DE98/02822, filed on Sep. 22, 1998.

(30) Foreign Application Priority Data

Sep. 22, 1997 (DE) .......................................... 197 41 669

(51) Int. Cl.[7] .............................................. G08B 21/00
(52) U.S. Cl. ...................... 340/958; 244/114 R; 701/3
(58) Field of Search .................................. 340/958, 945, 340/506; 73/128 R; 244/114 R; 342/23; 356/401; 382/104, 216; 701/3, 120, 121; 455/431; 348/143

(56) References Cited

U.S. PATENT DOCUMENTS

| | | |
|---|---|---|
| 4,249,159 A | 2/1981 | Stasko |
| 4,970,389 A | 11/1990 | Danforth et al. |
| 5,077,805 A | 12/1991 | Tan |

(List continued on next page.)

FOREIGN PATENT DOCUMENTS

| | | |
|---|---|---|
| DE | 40 09 668 | 2/1991 |
| DE | 43 01 637 | 8/1994 |
| DE | 196 02 607 | 8/1997 |

(List continued on next page.)

OTHER PUBLICATIONS

Patent Abstracts of Japan, vol. 018, No. 559 (M–1692), Oct. 25, 1994 & JP A 06 199297 (Nippon Signal Co., Ltd.), Jul. 19, 1994.
Patent Abstracts of Japan, vol. 018, No. 559 (M–1692), Oct. 25, 1994 & JP A 06 199298 (Nippon Signal Co., Ltd.), Jul. 19, 1994.
Patent Abstracts of Japan, vol. 018, No. 264 (P–1740), May 19, 1994 & JP A 06 036200 (Toshiba Tesco KK) Feb. 10, 1994.
"Digital Image Processing", W.K. Pratt, Section 12.1, 12.2, Wiley, New York, 1978, pp. 307–318.
"Computer Vision", Ballard et al, Prentice–Hall, Inc., Englewood Cliffs, NJ, pp. 65–70.
"Fundamentals of Digital Image Processing", A.K. Jain, Prentice Hall, Englewood Cliffs, NJ, pp. 400–407.

*Primary Examiner*—Brent A. Swarthout
(74) *Attorney, Agent, or Firm*—Sughrue Mion, PLLC

(57) ABSTRACT

A docking system for airport terminals has a docking station subsystem and a docking station for each gate. The docking station subsystem is connected via a communication network to a central working position. The docking station subsystem includes an airfield situation monitoring and processing segment ASMPS, at least one advisor and guidance display segment AGDS, a data and status handler segment DSHS having at least one video camera (9, 10) for each center line of the gate, and at least one ground operation panel segment GOPS. The docking station subsystem has an auxiliary subsystem connected to it, by which information relating to aircraft models and the gate can be entered in the docking station subsystem. A docking guidance system is connected to other systems of an airport and includes a docking guidance subsystem for each gate of the airport.

31 Claims, 17 Drawing Sheets

U.S. PATENT DOCUMENTS

| | | |
|---|---|---|
| 5,109,345 A | 4/1992 | Dabney et al. |
| 5,166,746 A | 11/1992 | Sato et al. |
| 5,226,204 A * | 7/1993 | Schoenberger et al. ...... 14/21.5 |
| 5,280,530 A | 1/1994 | Trew et al. |
| 5,285,205 A | 2/1994 | White |
| 5,434,927 A | 7/1995 | Brady et al. |
| 5,495,535 A | 2/1996 | Smilansky et al. |
| 5,495,537 A | 2/1996 | Bedrosian et al. |
| 5,509,082 A | 4/1996 | Toyama et al. |

FOREIGN PATENT DOCUMENTS

| | | |
|---|---|---|
| EP | 459295 B1 | 12/1991 |
| GB | 2246261 A | 1/1992 |
| WO | WO 96/09207 | 3/1996 |
| WO | WO-9609207 * | 3/1996 |
| WO | WO 96/12265 | 4/1996 |
| WO | WO 97/14114 | 4/1997 |

* cited by examiner

Examples of system architectures
DGS System using different CWP Operator Stations with a CWP Server System Architecture using a CWP Server DGS System using one CWP Operator Station System Architecture using Standalone Systems connectes to a CWP Station DGS System using individual Stand Alone Systems System Architecture using Standalone Systems connected each other via Ethernet Interface FIG 20 SIDOGS-System Overview

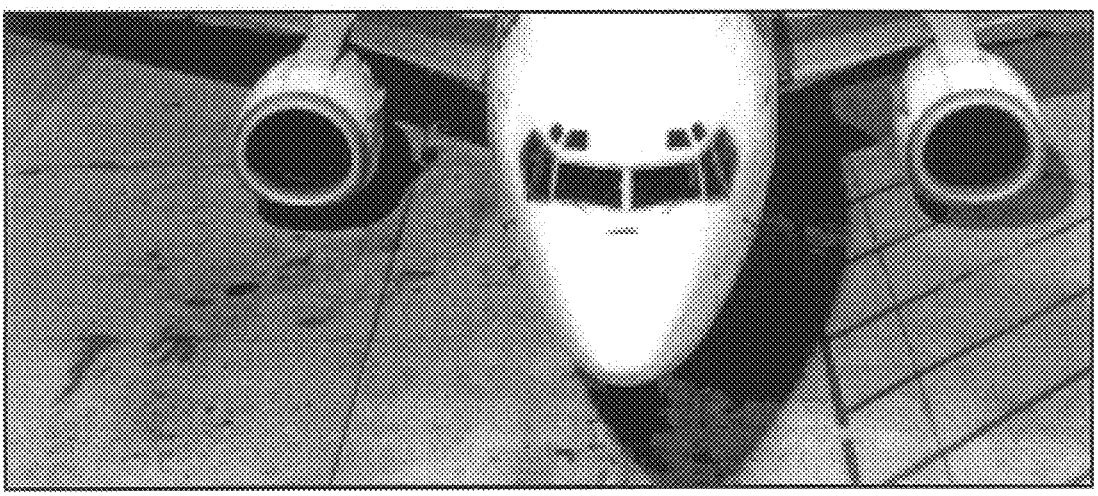
FIG 22  Angular Field of the Camera

DOCKING SYSTEM FOR AIRPORT TERMINALS

This is a Continuation in Part of U.S. application Ser. No. 09/533,245 with a filing date of Mar. 22, 2000, now abandoned, which in turn, is a Continuation of International Application PCT/DE98/02822, with an international filing date of Sep. 22, 1998, which was published under PCT Article 21(2) in German. The disclosure of both these Applications is incorporated into this application by reference.

FIELD OF AND BACKGROUND OF THE INVENTION

The invention relates to new and useful improvements in a docking system for airport terminals. More particularly, the invention relates to a docking system for airport terminals having a positioning apparatus by which an aircraft can be guided to a parking position appropriate for its type, a video device by which the aircraft can be detected as it approaches the airport terminal, and an evaluation unit by which it is possible to evaluate data which are supplied to the evaluation unit by the video device and which relate to the form and the movement of the aircraft.

German Patent DE 40 09 668 A1 discloses a procedure in which a video camera is used to detect a two-dimensional image, which is passed to an evaluation unit.

OBJECTS OF THE INVENTION

An object of the invention is to further develop the known docking system. A further object is to develop the known system in such a manner that it can be used even in adverse environmental and weather conditions with an extremely high operational reliability, sufficient for the operation of airports.

SUMMARY OF THE INVENTION

These and other objects are achieved according to one formulation of the invention in that a template set for each different type of aircraft is stored in the evaluation unit, which set contains at least three, preferably five, specific templates for all types of aircraft or outline sections of the relevant type, and in that the at least three, preferably five, specific outline sections of the aircraft which is approaching the airport terminal can be determined and compared with the stored template sets, in the evaluation unit, from the input signals from the video device.

According to another aspect of the invention, a docking system is provided for airport terminals, which has a comparatively low level of installation complexity and, furthermore, allows the airport terminals to be operated in a safe and, for the most part, automated fashion. Precise detection of the type of aircraft approaching the airport terminal is ensured even if the entire contour of the approaching aircraft cannot be detected by the video device, for example because there are obstructions in the parking area or ramp area of the airport terminal.

A monochrome camera has been found to be a particularly suitable video device for implementing the docking system according to the invention and its positioning apparatus.

The objective focal lengths of the video device should advantageously be 16 or 25 mm.

Adequate detection of the aircraft approaching the airport terminal is ensured if the video device is arranged such that it is approximately aligned with the center line of the airport gate, preferably at a height of approximately 9 m.

The type of aircraft approaching the airport terminal can be detected with a comparatively low level of complexity if a sequence of gray tone images produced by the monochrome camera can be read to the evaluation unit, the individual gray tone images in the sequence can be spatially filtered in order to extract gray tone edges, the sequence of gray tone images can be filtered in the time domain in order to produce moving images, and a mask can be produced from the moving images defining areas for subsequent segmentation.

The evaluation unit should expediently have a Sobel filter for spatial filtering of the gray tone images, and for filtering the gray tone images in the time domain.

Two engines, the windshield and two landing gear legs have been found to be outline sections which are particularly specific to the aircraft contour of each type. These five specific outline sections or templates expediently form a template set. This template set is defined for the respective aircraft type and stored in the evaluation unit.

Trajectories of the templates or specific outline sections of the aircraft contour can be used as a basis to determine the present position of the aircraft as it approaches the airport terminal.

When the docking system according to the invention, in particular its positioning apparatus, is implemented and installed completely, it is possible to allow all the processes required for docking of the aircraft, in particular the docking of the bridge to the aircraft, to be carried out automatically. In this case, it is possible for the video device to have only one video camera.

In a particularly advantageous manner, the pixel processing described above as well as the detection of the type of aircraft approaching the gate of the airport terminal can be used for a docking system for airport terminals wherein each gate has a docking station subsystem. The docking station subsystem is connected via a communication network to a central control device. In addition, it has an airfield situation monitoring and processing segment, at least one advisor and guidance display segment, a data and status handler segment having at least one video camera for each center line of the gate, and at least one gate operator panel segment. An auxiliary subsystem is connected to the docking station subsystem, by which information relating to aircraft models and the gate can be entered into the docking station subsystem.

The docking station subsystem expediently has an advisor and guidance display segment for each center line of its gate.

A particularly advantageous embodiment of this advisor and guidance display segment is achieved if a microprocessor is provided which controls the display elements and converts display commands into indications of the display elements.

An embodiment of the docking station subsystem according to the invention and of the docking system according to the invention which is less complex in terms of equipment and design is achieved if the data and status handler segment of the docking station subsystem runs on the same hardware as the airfield situation monitoring and processing segment. Also, in this embodiment, the communication between the docking station subsystem and the central control device takes place via the communication network, and the processes within the docking station subsystem are coordinated by the data and status handler segment.

In a further development of the docking system according to the invention, the data and status handler segment and the airfield situation monitoring and processing segment of the docking station subsystem may be arranged in one housing.

Expediently, the data and status handler segment and the airfield situation monitoring and processing segment may run on a hardware basis comprising a PC motherboard and video signal processing equipment.

If the design of the docking station subsystem for the docking system according to the invention provides for the data and status handler segment and the airfield situation monitoring and processing segment to be arranged outside the actual gate, it is possible to additionally arrange the advisor and guidance display segment in the housing common to the two components mentioned above.

In a further specific embodiment of the docking system according to the invention, the docking station subsystem is designed such that it allows advisor and guidance displays to be transmitted to a screen in the cockpit of an aircraft which is approaching the gate. This mode of operation may be used instead of operating the advisor and guidance display segment, or may be provided in addition to operating this advisor and guidance display segment.

It is also possible to arrange the airfield situation monitoring and processing segment in a housing with the video camera.

For transmission of data between the airfield situation monitoring and processing segment and the data and status handler segment of the docking station subsystem, it is expedient for the airfield situation monitoring and processing segment to have an associated digital signal processor. In the digital signal processor, the originally analog video signals are converted into digital signals before they are passed to the input line to the data and status handler segment.

The auxiliary subsystem which is associated with the docking station subsystem of the docking system according to the invention preferably has an aircraft model output, a gate installation planner, a calibration unit and a validation and diagnosis tool. The communication network of the docking system according to the invention is advantageously in the form of a high-speed network using an asynchronous transmission mode, by which originally digital signals and originally analog signals converted into digital signals can be transmitted, e.g. video signals.

The ATM high-speed network may advantageously have at least one network adapter in the form of a SICAN-ATMax 155-PM2.

The docking station subsystem of the docking system according to the invention is systematically and expediently broken down into a ground area monitoring and processing segment, a gate area control segment, a gate schedule segment and a gate data handler segment.

The ground area monitoring and processing segment advantageously has an airfield monitor and an airfield situation processor, which is connected by means of an interface to the gate schedule segment.

The gate area control segment of the docking station subsystem of the docking system according to the invention has airfield ground lighting, an advisor and guidance display, a ground operator panel, a luxometer and a gate area processor. The gate area processor runs on a PC platform to which the airfield ground lighting, the advisor and guidance display, the ground operation panel and the luxometer are connected. In addition, the gate area processor is connected by an interface to the gate schedule segment.

The gate data handler segment should advantageously have a calibration support and static data handler, which run on a PC platform and are connected in each case by means of one interface to the gate schedule segment.

The gate schedule segment of the docking station subsystem of the docking system according to the invention has gate management and a watchdog.

In accordance with another formulation of the present invention, a docking guidance system includes a plurality of stand alone systems, which are associated with respective gates of an airport. These stand alone systems are interconnected by a network. If an aircraft approaches a particular gate, at which it is to be docked, the respective stand alone system guides the aircraft to its proper final parking position at the particular gate. To this end, the respective stand alone system receives guidance data regarding the guidance of the aircraft, e.g., data from a video camera, which attempts to recognize the aircraft type and which monitors the current position and movement of the aircraft.

In the case of large and mid-sized airports, these guidance data are forwarded to a central working station, which monitors and controls the overall operation of the docking guidance system. In addition, the central control device exchanges data with external airport systems, such as a surface movement guidance and control system (SMGCS) and a central monitoring system (CMS). In the case of large airports, which have many terminals, the central control device also exchanges data with operator stations at each terminal. In the case of mid-sized airports, only one operator station is provided, which is located at the central control device, for example. By processing all these data from the different systems of an airport, the central control device is capable of performing its central monitoring and control function for the docket guidance system.

In the case of small airports, it is possible to dispense with an operator station and a central control device. Instead, all the stand alone systems communicate directly with each other over the network connecting the stand alone systems. In this way, a docking process of an aircraft, which is in progress at a particular gate, can be monitored and, if necessary, influenced by an operator present at another gate, for example.

BRIEF DESCRIPTION OF THE DRAWINGS

The invention and further advantageous embodiments of the invention according to the features of the dependent claims are explained in more detail below with the aid of diagrammatic, exemplary embodiments in the drawings, in which:

FIG. 22 represents a preferred calibration system for calibrating the angular field and/or position of a TV camera or video camera of the docking guidance system according to the present invention.

DETAILED DESCRIPTION OF THE PREFERRED EMBODIMENTS

Figure 1:
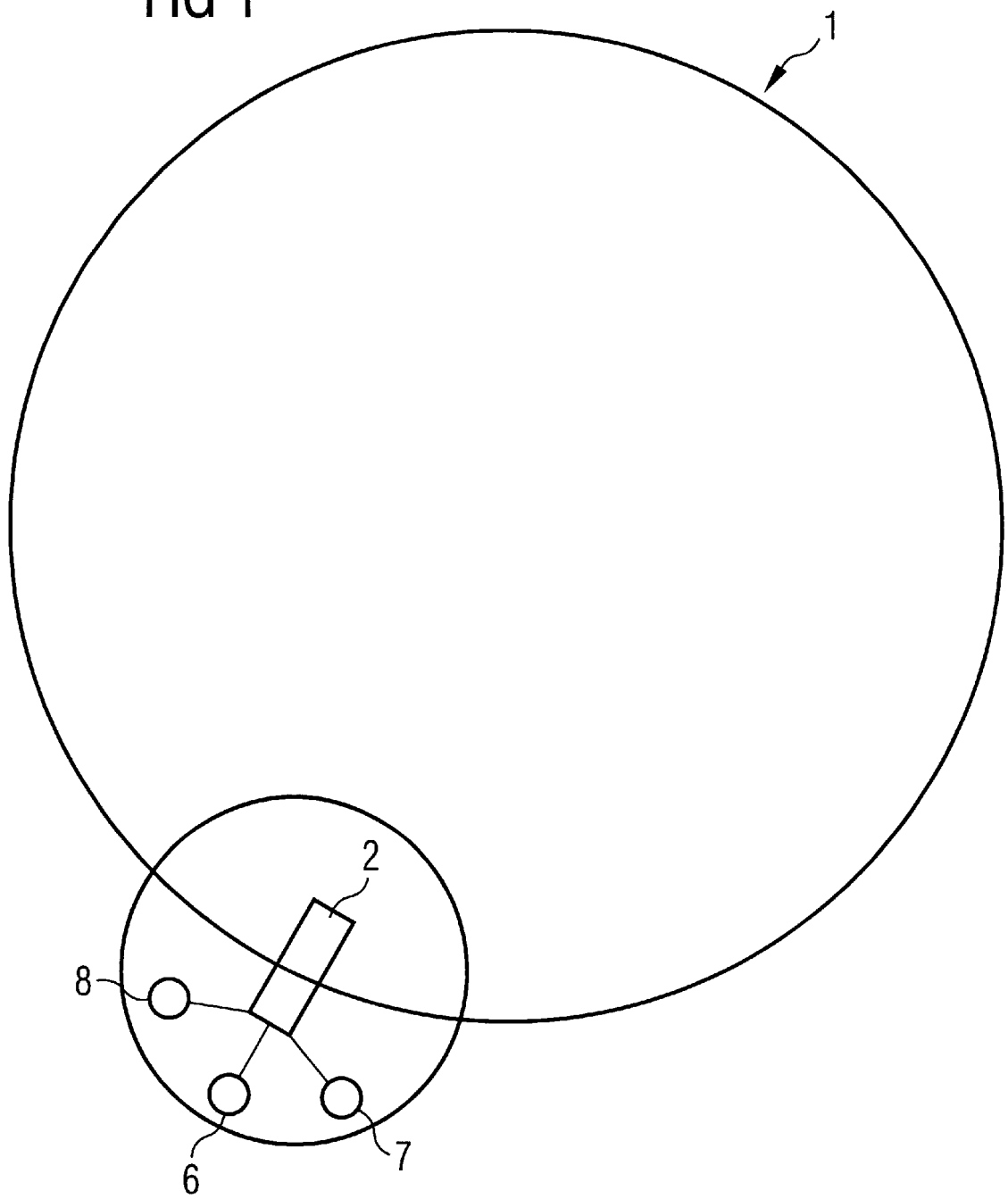
FIG. 1 shows a basic illustration of the docking system according to the invention, and its integration in an airport network.
Figure 2:
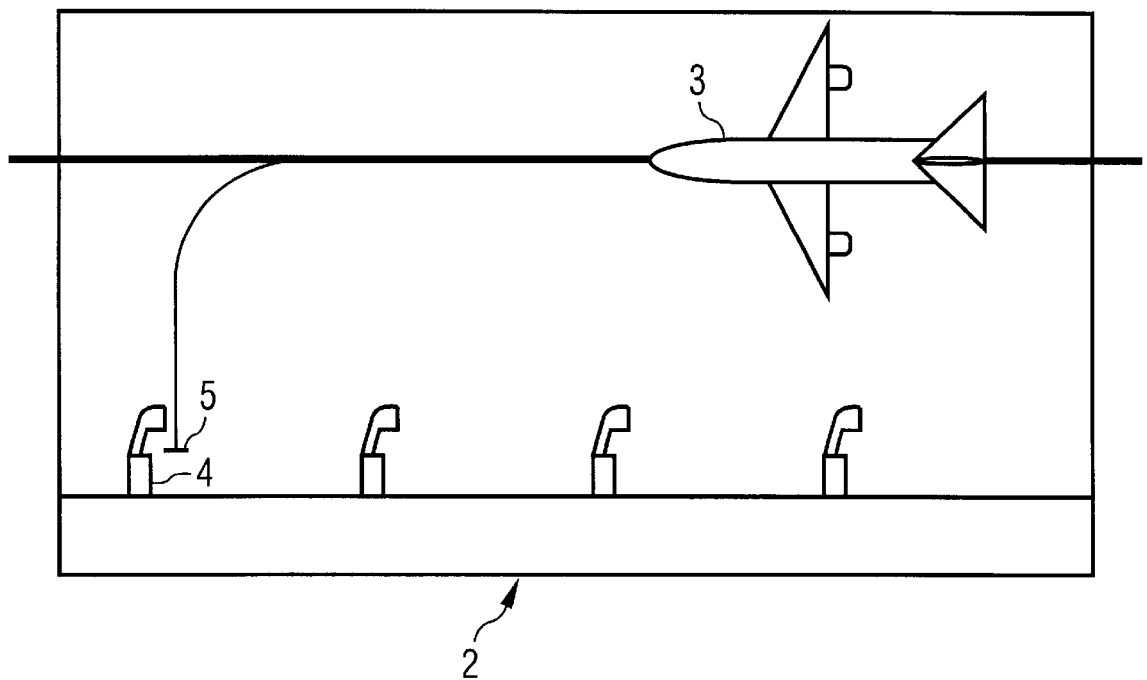
FIG. 2 shows a basic illustration of an aircraft approaching a gate of an airport terminal.

An airport terminal 2 integrated in an airport network 1 as shown in principle in FIG. 1 is equipped with a docking system by which, via a bridge, a connection to the interior of an aircraft 3 can be produced (FIG. 2).

In order to position the aircraft 3 correctly for the docking process at the airport terminal 2, all the gates 4 of the airport terminal 2 each have an associated positioning apparatus, by which the aircraft 3 that is intended to be docked can be guided to a stopping or parking position 5 appropriate to its type.

To this end, the positioning apparatus has a video device 6, which, in a preferred embodiment, is in the form of a monochrome camera, by which the aircraft 3 can be detected as it approaches the gate 4 of the airport terminal 2. The positioning apparatus additionally includes an evaluation unit 7 by which data supplied to it from the video device 6 and relating to the form and movement of the aircraft 3 can be evaluated. Finally, the positioning apparatus includes a display 8 by which a pilot of the aircraft 3 can be provided with information required to move the aircraft 3 to the intended parking position 5.

Since the parking position 5 differs depending on the type of approaching aircraft 3, the positioning apparatus first of all has to determine the type of aircraft 3 that is approaching. To do this, the video device 6 is used to produce gray tone images onto which the aircraft 3 that is approaching the gate 4 is mapped. By means of the video device 6, a sequence of gray tone images, showing different positions of the aircraft 3 that is approaching the gate 4, is read into the evaluation unit. Evaluation of this sequence of gray tone images within the evaluation unit allows moving edges to be detected, which correspond to the outline of the aircraft 3 that is approaching the gate 4. This is done firstly by using spatial filtering, by which the spatial edges in the individual gray tone images are found. Filtering in the time domain is used to extract edges which move over time, so that it is possible to distinguish between moving and stationary objects. This makes it easier to determine an aircraft outline from the gray tone images. Each type of aircraft has a specific aircraft outline which, for its part, has specific outline sections or templates. For selecting suitable templates, a template set may be formed, to provide examples of the respective types of aircraft. This template set may contain three, or preferably five, individual templates.

A template set is stored within the evaluation unit 7 for each type of aircraft. The aircraft contour determined for the aircraft 3 approaching the gate 4, or the template set resulting from this, is now compared with the template sets stored within the evaluation unit. As the result of this comparison operation, the type of aircraft 3 approaching the gate 4 of the airport terminal 2 is determined. This type has a specific associated parking position 5. Details are now indicated on the display 8 to allow the aircraft captain or pilot to move his aircraft 3 to this parking position 5.

The aim of the following text is to describe in detail how edge operators in spatial space are used to extract the stationary gray tone edges from the gray shade images, in order to obtain the aircraft contour.

A Sobel operator can advantageously be used for this purpose, which is not derived from a mathematically closed form. This Sobel operator has the following forms:

Form 1:

-1, -2, -1,
0, 0, 0
1, 2, 1

Form 2:

-1, 0, 1,
-2, 0, 2
-1, 0, 1

Form 1 extracts edges located horizontally in the gray tone image, and form 2 extracts edges located vertically in the gray tone image. This is done by means of a weighted first derivative in the respective coordinate direction under consideration. Both Sobel operators have been applied to the gray tone image, and their results have been linked alternately by pixels:

$$b_{i,j} = \frac{\sqrt{b_{1,i,j}^2 + b_{2,i,j}^2}}{\sqrt{2}}.$$

Moving edges can be extracted not only by considering a gray tone image, but also by considering a time sequence of gray tone images. The filter cores therefore have to have a time dimension. Not only filter cores which have only one time dimension, but also filter cores which have time and space dimensions were investigated.

A Laplace filter, a Mexican hat operator or a HildrethMarr operator and a Sobel operator have been found to be particularly expedient as filter cores. In the latter case, the concept of a two-dimensional edge filter which operates with a weighted first derivative was expanded to three dimensions. This results in the following operator core in three dimensions of size 3×3×3:

$$-1, -1, -1,$$
$$-1, -8, -1$$
$$-1, -1, -1$$
$$t = 0$$
$$0, 0, 0$$
$$0, 0, 0$$
$$0, 0, 0$$
$$t = 1$$
$$1, 1, 1$$
$$1, 8, 1$$
$$1, 1, 1$$
$$t = 2$$

Filtering using the Sobel filter produced the best results for both the spatial and time edges.

Figure 3:
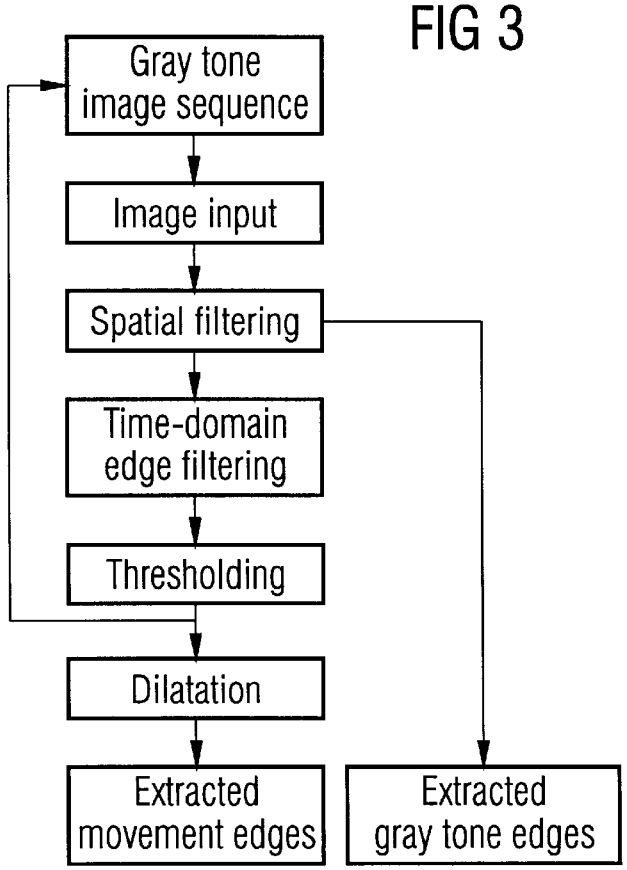
FIG. 3 shows a basic illustration of the method for finding an aircraft outline of an aircraft approaching a gate.

FIG. 3 shows the fundamental program sequence for determining the aircraft contour.

A gray tone image sequence which has been recorded by the video device 6 is passed via a video input to the evaluation unit 7. There, this gray tone image sequence is subjected to spatial filtering, by which spatial edge filtering of the respective gray tone image is carried out. The result of this spatial edge filtering represents the magnitude of a Sobel operator in the x direction and y direction, and is stored. This spatial edge filtering is used to extract gray tone edges, which are available as an intermediate result.

Time-domain edge filtering of successive grayshade images is carried out in the time-domain filtering which follows the spatial filtering. The result of this time-domain edge filtering represents the magnitude of a Sobel operator expanded by the time direction, and is stored. An intermediate result is once again available as the result of the time-domain edge filtering.

The thresholding which follows the time-domain filtering is used to produce a binary image from the gray tone image. The digitization threshold is defined by the variable threshold value. For gray shades below this threshold value, a low value is entered in the output binary image, and a high value is entered in it for values which are equal to or exceed the threshold value. The thresholding provides a further intermediate result.

The thresholding is followed by the functional stage of dilatation, in which the binary image produced in the course of thresholding is subjected to dilatation with a size of one pixel, that is to say all those areas which have a gray level greater than zero are enlarged by one pixel at their boundaries. The functional stage of dilatation provides an intermediate result, which corresponds to the mask or outline contour of the aircraft 3 approaching the airport terminal 2 or its gate 4.

Figure 4:
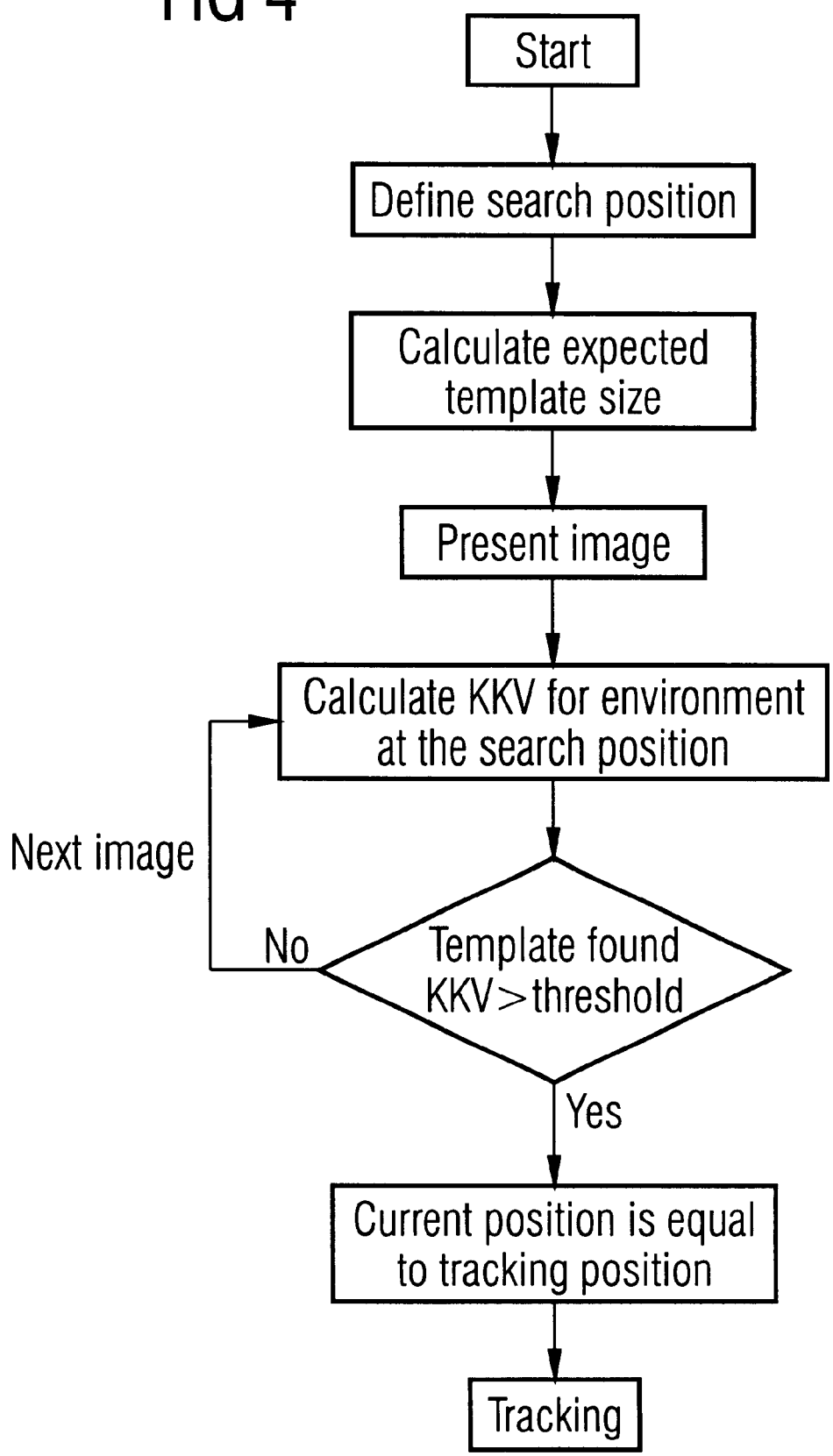
FIG. 4 shows a sequence for searching for the aircraft outline of the aircraft approaching the gate, and for initiation of tracking and following the aircraft found.

The aircraft contour is positioned by the method whose principle is illustrated in FIG. 4. In this case, it is assumed that the aircraft 3 that is approaching the gate 4 of the airport terminal 2 will turn in at the latest at a predetermined minimum distance from the parking position in the region of the gate 4. It is also assumed that the aircraft captain or pilot will in the process orient himself approximately on the center line of this gate 4. To do this, a catchment position is defined on this center line. A search area is defined around this catchment position, in which area the features that define the aircraft contour or the aircraft type are searched for. The defined size of this catchment area depends on the permissible lateral error for the aircraft 3 that is approaching the gate 4.

The individual templates which form the template set for an aircraft type must be chosen such that they are not invariant with respect to displacements. Furthermore, they are chosen to have a high contrast in the sequence of gray tone images. In addition, the selected features or templates must be highly tolerant to external influences, such as lighting and weather. The following features and individual templates have therefore been chosen for the aircraft types so far included in the form of template sets: The two engines, the windshield and the two landing gear legs. An individual template set is produced for each aircraft type by these individual templates.

The aircraft 3 is now looked for around the position defined in the ramp area. Since the aircraft 3 is a rigid body, a fixed arrangement of the chosen features can be predetermined. These features may appear distorted only due to the orientation of the aircraft 3 with respect to the video device 6. For this reason, it is desirable to find an optimum or elastic grid. In order to achieve this aim, the system looks for the maximum cross-covariance value in a defined search area around each template. The sum of all the cross-covariance values is a measure of whether the aircraft type has been found. By using an elastic grid, it is also possible in the process of "position determination" that follows later to determine the orientation of the aircraft 3. This orientation information may in turn be used for better tracking.

The search is carried out in the spatial Sobel-filtered image, which reproduces the gray tone edges and is thus considerably less sensitive to lighting influences than the underlying edge image. In comparison to other operators, the spatial Sobel-filtered image has the best edge contrast with the best noise suppression.

The position of a template is determined by shifting the template over the edge image until the similarity measure assumes a maximum. The cross-covariance is used as the similarity measure for this purpose, since this forms a better maximum/environment contrast than cross-correlation. It also has a better maximum-to-noise ratio compared to Euclidean distance.

Figure 5:
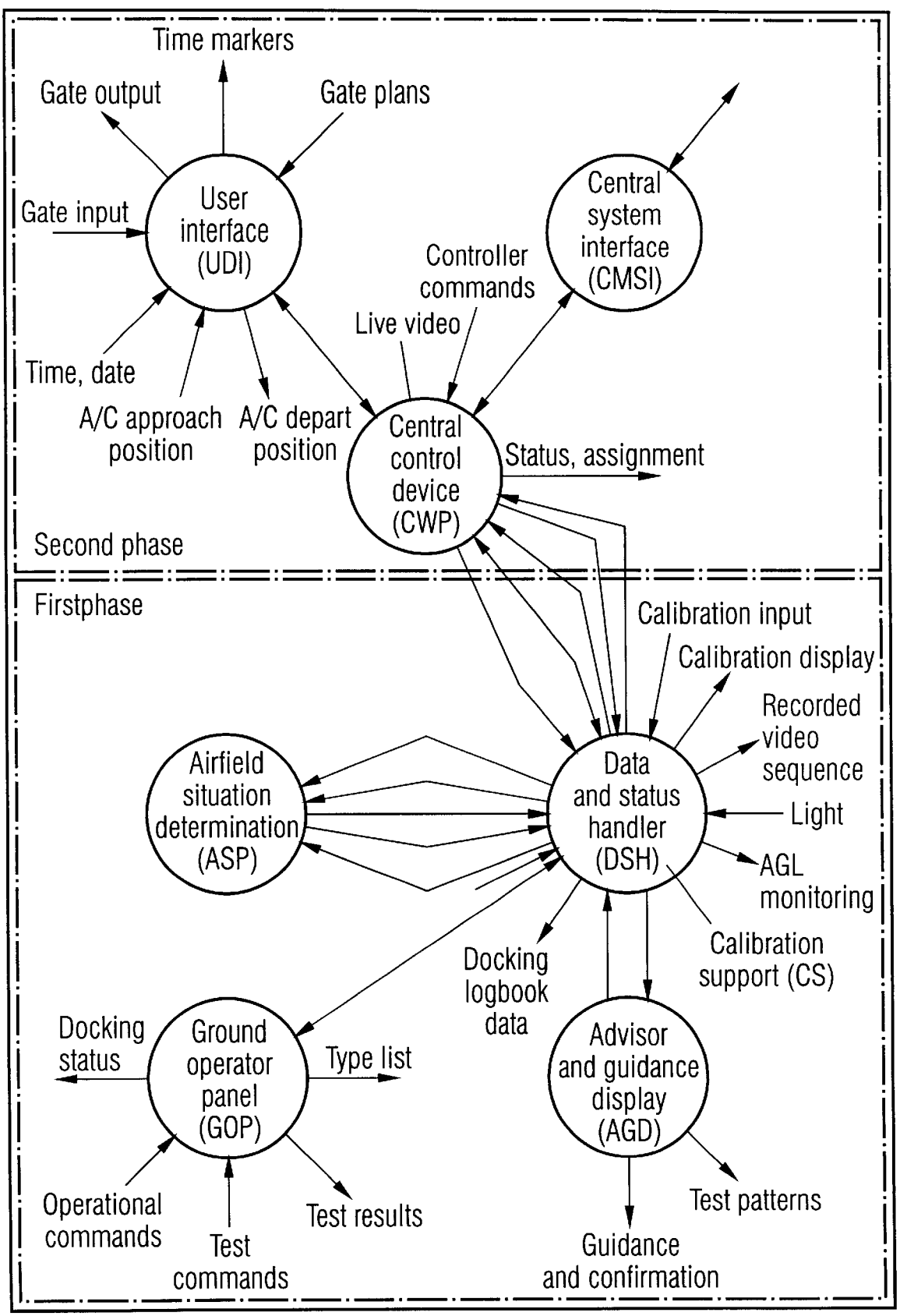
FIG. 5 shows a data flowchart of the docking system according to the invention and its integration in the communication network of an airport.

The data flowchart illustrated in FIG. 5 shows how individual functional components of the docking system according to the invention communicate with other functional components of this system and with further functional components of an airport control system outside the actual docking system.

FIG. 5 is subdivided into a first phase and a second phase, as is shown by the dotted boundary lines in FIG. 5. The lower part, which describes the first phase, of FIG. 5 is the major element for the docking system according to the invention, since the major functional elements of the docking system itself are illustrated there. In contrast, the upper part of FIG. 5 shows a central control device (CWP) of an airport, which is connected to the docking system according to the invention. The central control device (CWP), for its part, is related to the airport control system via a central monitoring and surveillance system interface (CMSI) and a user defined interface (UDI).

In the illustration in FIG. 5, the docking system according to the invention is broken down into four functional units. First of all, a functional unit comprising a docking status/data handler (DSH) and calibration support (CS) is provided there. This functional unit receives central control signals, database updates and monitoring and surveillance data relating to the respective gate (gate i CMS data) from the CWP. From this functional unit DSH, CS the CWP receives status details relating to the respective gate (gate i statuses), live video signals from this gate (gate i live video) and central monitoring and surveillance data relating to this gate (gate i CMS data).

The functional unit DSH, CS has a calibration input and an output to a calibration display. Furthermore, the functional unit DSH, CS outputs recorded video sequences as well as control signals for the airfield ground lighting (AGL control). The DSH operates together with a further functional unit, namely the airfield situation processor (ASP) on a PC based system. The functional unit ASP receives from the DSH of the functional unit DSH, CS control signals for the ASP (ASP control), initialization data and black-and-white video data (B & W Video Data). The DSH of the functional unit DSH, CS receives from the functional unit ASP tracking results as well as ASP check results.

Furthermore, data relating to the gate configuration are entered in the functional unit DSH, CS while, in contrast, said functional unit outputs data relating to the docking process (docking log data).

As a further functional unit, the docking system according to the invention has a ground operator panel (GOP) from which transfer data are entered in the functional unit DSH, CS, and which receives transfer data from the functional unit DSH, CS. Furthermore, operation commands and test commands are entered in the GOP, while the GOP outputs the docking status, test results and an aircraft type table (a/c type table).

An advisor and guidance display (AGD) is provided as a further functional unit of the docking system according to the invention, which enters self test results in the functional unit DSH, CS and receives from this functional unit data to produce the characters for the display information (display information character generation data). The AGD outputs guidance and verification signals and test patterns. A preferred embodiment of a display of the AGD is described in more detail in connection with FIG. 20.

Figure 6:
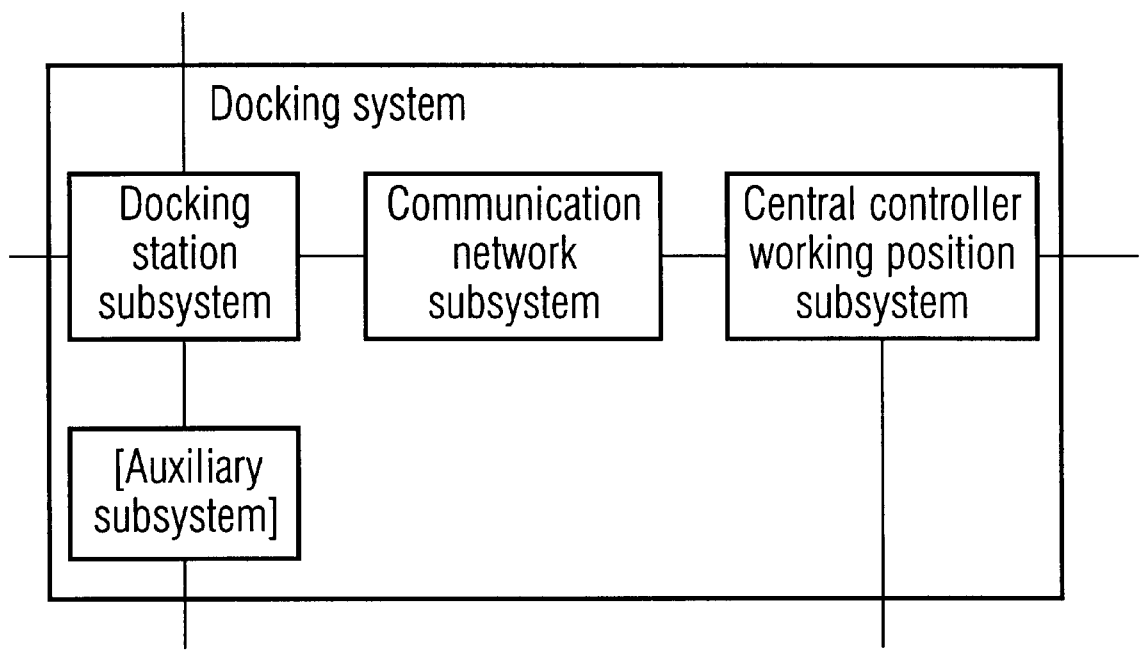
FIG. 6 shows a basic illustration of the major components of the docking system according to the invention.

As can be seen from FIG. 6, the docking system DGS according to the invention in principle has three partial operating systems, namely a docking station subsystem (DSS), a central controller working position subsystem (CWPS) and a communication network subsystem (CNWS). The DSS contains all those system segments which are arranged at the gates. The CWPS comprises a display and control system which is based on a workstation and is provided in a central control room at the airport. The CNWS is the network which connects these two subsystems to one another, in order to transmit data between these subsystems.

An auxiliary subsystem (AuxS) associated with the DSS contains a number of auxiliary functions, for example the production of new aircraft models, the gate configuration and maintenance.

The DSS is connected on the one hand to the airfield situation, and on the other hand to the maintainer, calibrator, bridge personnel, ground personnel, (co-) pilot and the AGL. The gate specifier, the aircraft model specifier (a/c model specifier), the installation personnel and the research department can be connected to the DSS via the AuxS.

The CWPS of the docking system according to the invention is on the one hand connected to the administrator, the maintainer, the supervisor and the controller. On the other hand, it is connected to the central monitoring and surveillance system, the airport database, user defined gate systems, the AGL, time reference systems, and a surface movement guidance and control system (SMGCS).

The DSS serves two or more central lines or center lines for the gate. Two center lines or central lines can be served by one DSS, provided the two are mutually dependent and/or provided the one cannot be used while the other is in use.

Figure 7:
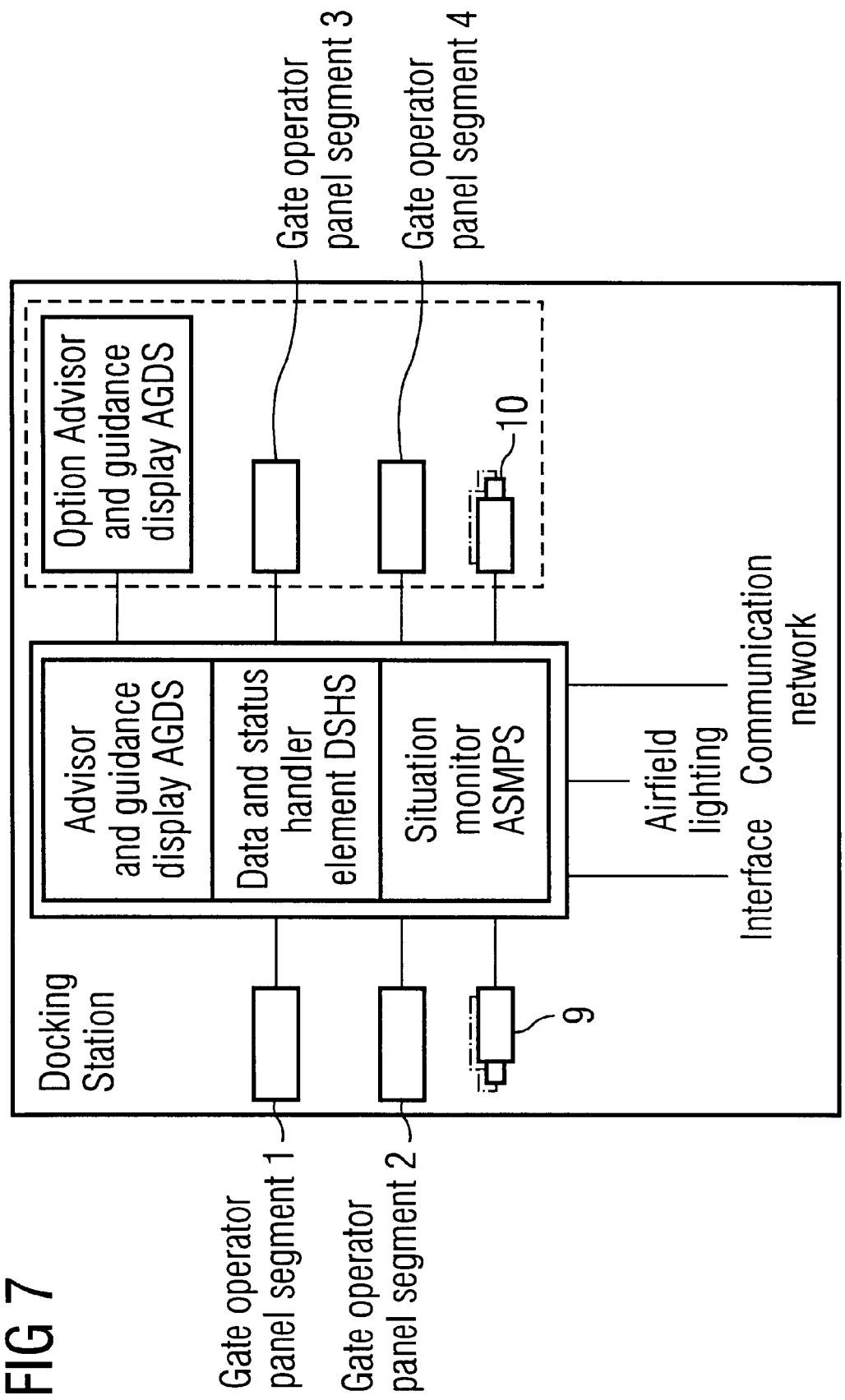
FIG. 7 shows a first embodiment of a docking station subsystem of the docking system according to the invention.
Figure 8:
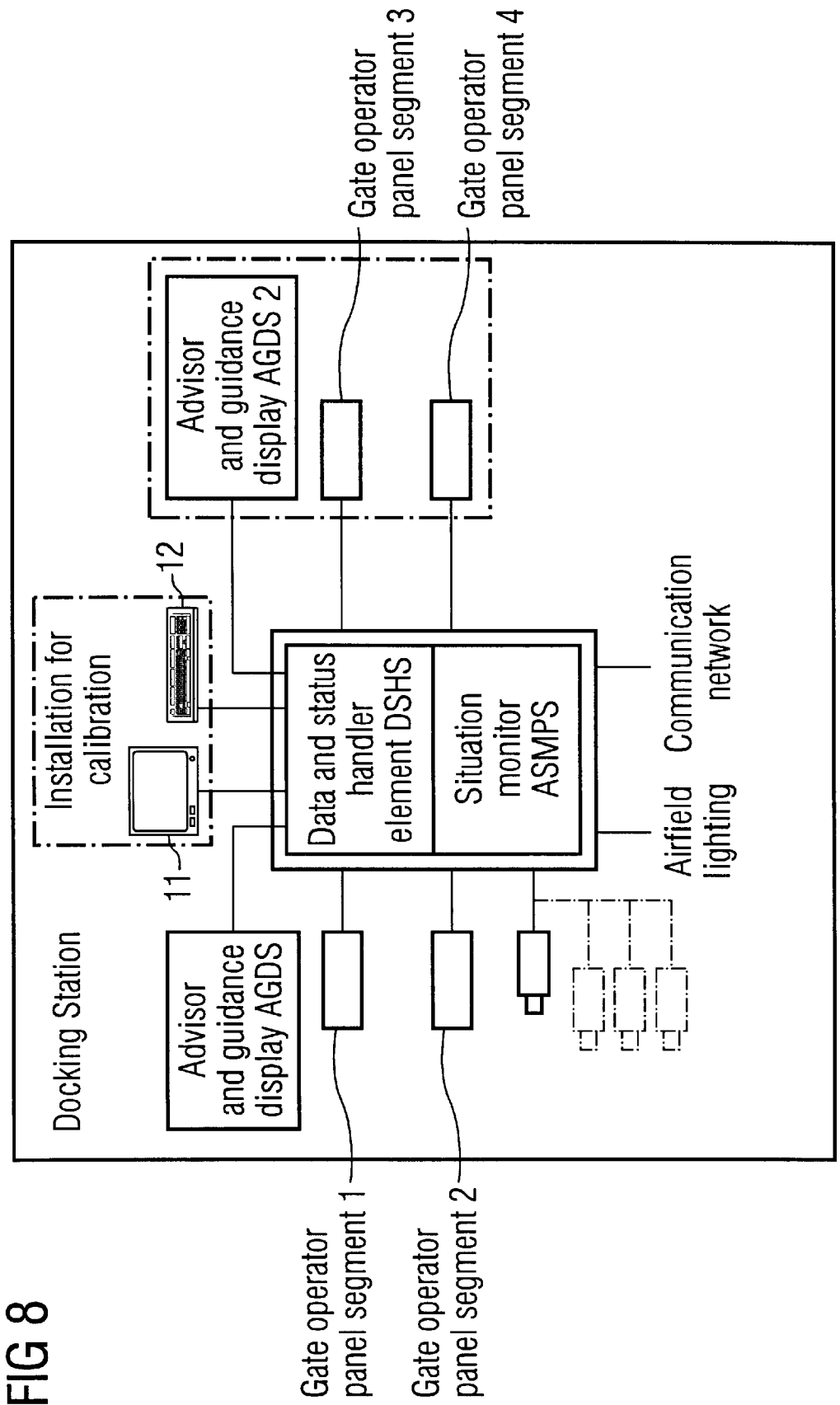
FIG. 8 shows a second embodiment of the docking station subsystem of the docking system according to the invention.
Figure 9:
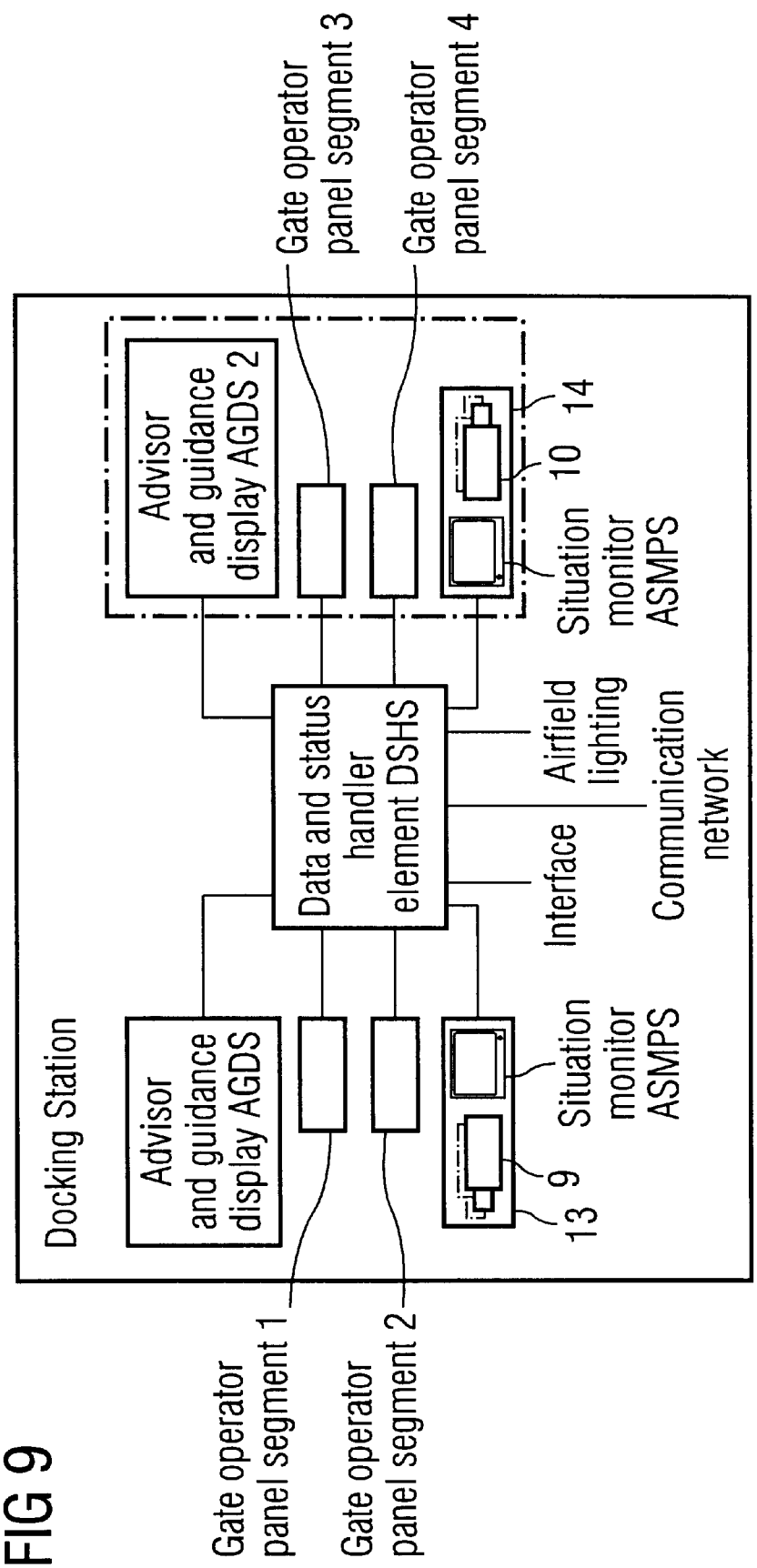
FIG. 9 shows a third embodiment of the docking station subsystem of the docking system according to the invention.

As can be seen from FIGS. 7, 8 and 9, the DSS has four different segments: the airfield situation monitoring and processing segment (ASMPS); the advisor and guidance display segment (AGDS); if there are two mutually dependent central or center lines, a second AGDS may be required, depending on the configuration and/or arrangement of the central or center lines at the gate. The AGDS contains an integrated microprocessor, which controls the display elements and converts display commands into displays; the data and status handler segment (DSHS) with one or two video cameras for each central line or center line; the number of video cameras for each central line or center line depends on the aircraft types which may dock at the respective gate; the DSHS runs on the same hardware as the ASMPS. It provides the communication between the DSS and the CWPS via the CNWS, and coordinates the processes within the DSS.

The gate operator panel segment (GOPS) is a microprocessor-based system having a small keyboard or keypad and a liquid crystal display LCD, which transmits only the input data to the DSHS and outputs the data from the DSHS to the LCD.

Three different embodiments of the docking station subsystem DSS differ essentially by the arrangement of the ASMPS and DSHS.

A first embodiment, illustrated in FIG. 7, provides for the ASMPS and the DSHS to be arranged in the same housing together with and at the same location as the AGDS, as can be seen from the double line surrounding said segments in FIG. 7.

The ASMPS and the DSHS run on a PC motherboard and on the video processing equipment which comprises, for example, a so-called frame grabber; interface elements are provided to the GOPS 1 to 4, to the AGDS 1 and 2, to the auxiliary interface and to the CNWS, but without any mechanically operating parts.

The auxiliary interface can be used, for example, to calibrate the video camera 9 and the further video camera 10, or to test the DSS. If the DSS is operated on its own, the auxiliary interface may be used to input the gate configuration and the aircraft database, or to output recorded video sequences. The AGDS has a simple microprocessor and three, or possibly four, LED arrays. The simple microprocessor provides the communication with the DSHS and controls the LED arrays.

RS 232, RS 422 and RS 485 type interfaces, or interfaces based on optical links, may be used as the interface between the DSHS and the GOPS 1 to 4 or the AGDS 2. An RS 232 type interface may be used as the interface between the DSHS and the AGDS.

The second version or embodiment of the docking station subsystem illustrated in FIG. 8 has a common housing just for the ASMPS and the DSHS, as can be seen from the double line which surrounds the two segments in FIG. 8. These two segments are arranged separately from the other equipment in an equipment room. The AGDS is, furthermore, arranged in the outer gate area, of course. It can be seen from this that the interfaces between these segments differ from those in the first embodiment. The interface between the AGDS and the DSHS now corresponds to the other RS 232, RS 422 etc. type interfaces.

A video monitor 11 and a keyboard or keypad 12 are now provided instead of the auxiliary interface, and can carry out the functions of the auxiliary interface provided in the first embodiment.

In the third embodiment of the DSS illustrated in FIG. 9, the ASMPS is accommodated inside a housing 13 or 14, respectively, of the video camera 9 or 10, respectively. The required software runs on a digital signal processor, which transmits the aircraft position digitally to the DSHS. The DSHS may be in the form of a PC or microprocessor board of relatively low performance. In principle, it is also possible to accommodate the DSHS in a housing with the AGDS or the AGDS 2.

The major difference between the described embodiments is the arrangement of the hardware that forms the ASMPS and the DSHS. There are more minor differences in the auxiliary interface and in the interface between the AGDS and the DSHS.

The first embodiment requires the capability for the hardware that forms the ASMPS and the DSHS to operate in outdoor environmental conditions.

The advantage of the first embodiment is that it involves only a minimum level of installation complexity. The interface between the AGDS and the DSHS has a simple configuration. On the one hand, the reliability may be greater since less installation complexity and no mechanically operating equipment parts are required. On the other hand, operation is required in outdoor environmental conditions; this reduces the reliability, even if cooling or heating measures are provided.

The auxiliary subsystem which is used as the auxiliary system AuxS is required to start and to maintain the system during system installation and during system maintenance. It comprises an aircraft model editor (AME), a gate installation planner (GIP), a calibration tool (CT), a validation and diagnosis tool (VDT) and a maintainer support tool.

The AME may be installed on a separate PC. In the second embodiment of the DSS, the aircraft model may be transmitted by means of a floppy disk to the operating system, while in the first and third embodiments it may be transmitted by means of a laptop PC and the auxiliary interface. If all the isolated systems are connected by a network, such data can be integrated via the CWPS.

The GIP produces a hard-copy installation plan and the gate configuration on a disk. The gate configuration may be entered in the operating system in the same way as the aircraft models.

The VDT may run on a separate PC. The data may be entered in this PC via the auxiliary interface if the system is isolated, or may be input via the CNWS and CWPS. In the second embodiment of the DSS, the VDT may also run on the isolated system.

The CT supports the calibration process with a graphics display. The calibrator can carry out the calibration interactively. The calculated calibration data remain in the DSS.

The CNWS may be in the form of an ATM network, in which at least one switching unit may be provided. A UNI 3.1 or UNI 4.0 should be used for signaling. 155 Mbit/s or 25 Mbit/s adapters may be used, depending on the bandwidth requirements. The distances which can be achieved depend on the transport medium: monomode fibers for long distances, multimode fibers for medium distances, or twisted double wires for short distances.

The advantages of such a high-speed ATM network are that long distances are possible, no electromagnetic interference occurs, DC isolation is provided, a guaranteed bandwidth is ensured between two data end points, and a guaranteed delay is ensured between two data end points.

The CWPS may run on a PC system using the Windows NT operating system. Furthermore, a Video-HW-ProVisionBusiness and an ATMax 155-PM2 ATM adapter from SICAN GmbH are preferably used as hardware components.

Figure 10:
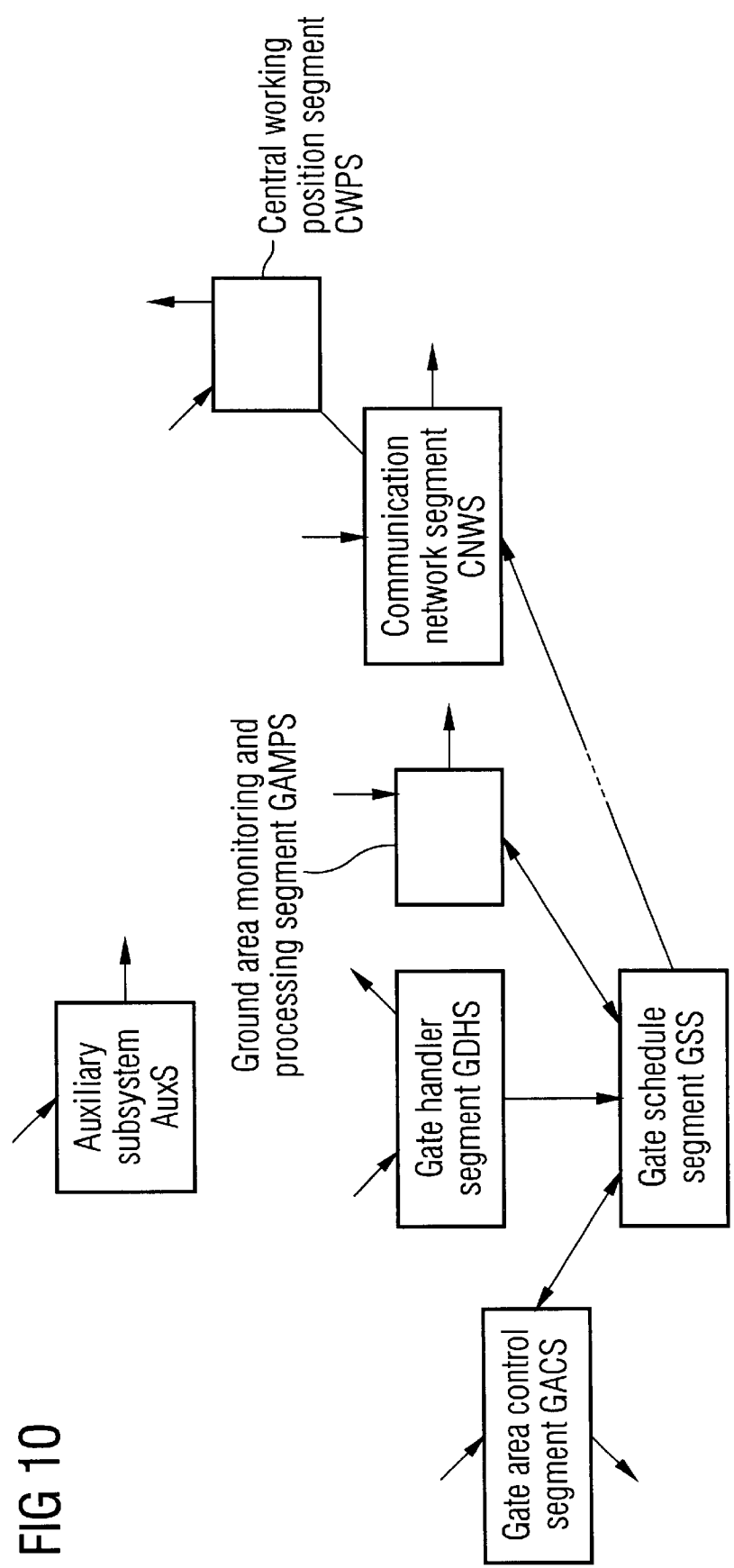
FIG. 10 shows a systematic segment structure of the docking system according to the invention.

In the DSS illustration chosen in FIG. 10, the subsystem level illustrated in FIGS. 7 to 9 has been omitted; based on the illustration in FIG. 10, the DSS has the following segments: a ground area monitoring and processing segment (GAMPS), a gate area control segment (GACS); a gate schedule segment (GSS), a gate data handler segment (GDHS), a communication network segment (CNWS), a central working position segment (CWPS); and an auxiliary functionalities segment (AuxS).

Figure 11:
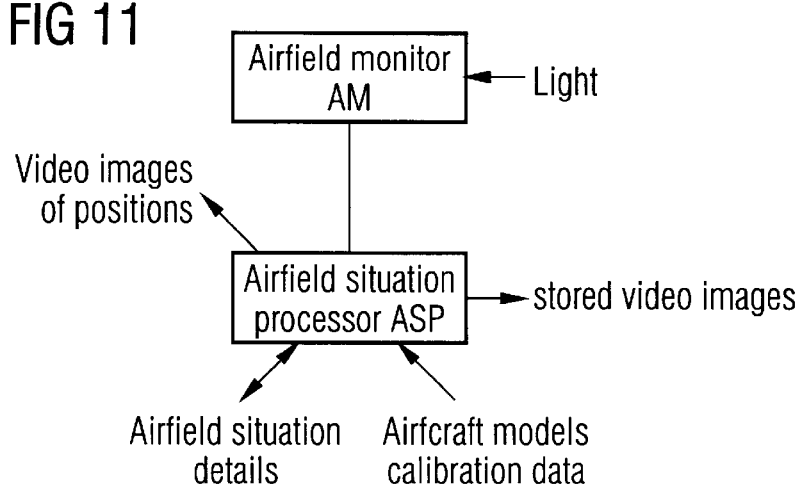
FIG. 11 shows a ground area monitoring and processing segment GAMPS of the docking station subsystem illustrated in FIG. 10.
Figure 12:
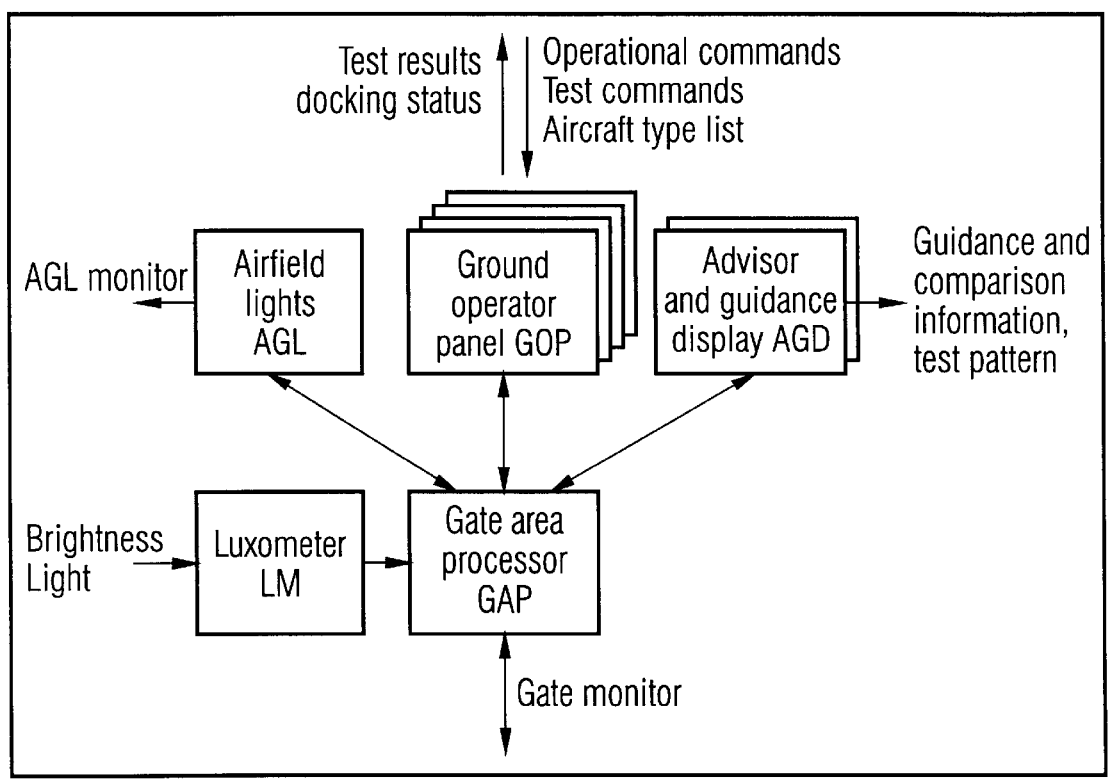
FIG. 12 shows a gate area control segment GACS of the docking station subsystem illustrated in FIG. 10.

The GAMPS illustrated in FIG. 11 has airfield monitoring (AM) and an airfield situation processor (ASP). This supports the following functions: frame grabbing, calculation of the display information from the position data which is provided by the ASMPS, processing of the airfield situation, calculation of real-world positions, and video recordings.

The GAMPS assists the GSS in investigating the airfield situation during the docking sequence. It provides self-test and calibration information as well as video images for calibration of the GSS. In addition, the GAMPS supplies the AuxS with recorded video sequences.

The GACS comprises the airfield ground lighting (AGL), the advisor and guidance display (AGD), the gate operator panel (GOP), the luxometer (LM) and the gate area processor (GAP). The GAP runs on a PC platform to which the AGL, the AGD, the GOP and the LM are connected.

The GACS supports the following functions: Measurement of the light intensity in the area of the gate; Switching for the AGL; Display of guidance and verification details for the aircraft pilot and display of test patterns for the ground personnel, with one or two AGDs being provided; Input of operating and test commands by the ground personnel via one to four GOPs, output of test results and docking status to the ground personnel via the GOP, self-testing of all parts of this segment, and communication and data interchange with the GSS.

The GACS has to measure the light intensity in the gate area, and convert it into dark or light information. The GACS converts the GOP inputs and forwards them to the GSS. On the other hand, the GACS receives commands from the GSS, interprets them, and passes the corresponding display information to the AGD and to the GOP, switches the AGL on or off, and tests the communication lines to the AGD and GOP.

Figure 13:
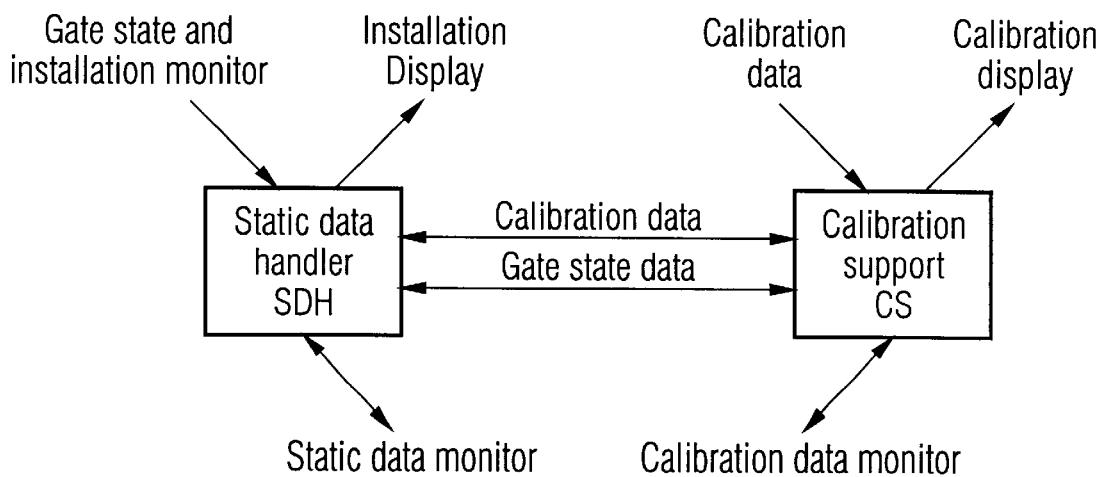
FIG. 13 shows a gate data handler segment GDHS of the docking station subsystem illustrated in FIG. 10.

The GDHS illustrated in FIG. 13 has a calibration support (CS) and a static data handler (SDH), both of which run on a PC platform.

The main tasks of the GDHS are management of the calibration process, management of updates of the gate configuration, and storage of the gate configuration and of the aircraft types.

During the set-up phase in isolated operation, it reads the gate configuration data from a file which has previously been produced by the GIP. In network operation, it reads the data via the GSS from the CNWS/CWPS, and stores this data internally.

Figure 14:
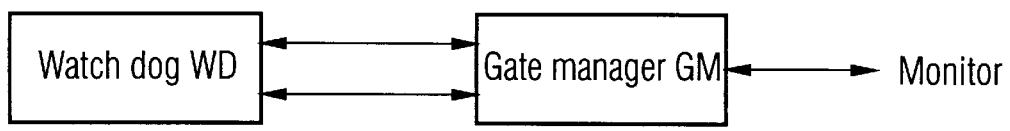
FIG. 14 shows a gate schedule segment GSS of the docking station subsystem illustrated in FIG. 10.

The GSS illustrated in FIG. 14 comprises the gate manager (GM) and the watchdog (WD).

The main tasks of the GSS are to control the action sequence within the signal, to supply the GAMPS with calibration and aircraft data, to produce time stamps and time inhibits, to trigger the watchdog and to interchange data with surrounding segments.

In isolated operation, the GSS provides the information input and output for the GOP via the GACS. In network operation, the interface to the CNWS/CWPS is also controlled. The GSS transmits compressed live video images and status information to the CNWS/CWPS. Alternatively, the docking sequences may be carried out via the CWPS. In this context, the information input and output for the GOP is interchanged via the GACS and via the CNWS with the CWPS.

During the set-up phase, system control is passed to the GDHS. In network operation, the GSS supplies the GDHS with the transmission of configuration data via the CNWS/CWPS.

During the calibration process, the GSS passes system control to the GDHS. It transmits video images from the GAMPS to the GDHS. It uses the GAMPS to verify calibration data. When the gate configuration is being updated, the docking mechanism is deactivated.

Upon completion of a docking sequence, the live video signals for the last docking sequence can be repeated either by the PC monitor, the keyboard or keypad and the mouse in isolated operation, or via the network on the CWPS in network operation. It is impossible to initiate a docking sequence while a recorded video sequence is being viewed.

Maintenance tests may be initiated through the GOPS by the ground personnel or, controlled by the CNWS/CWPS, through the GSS.

The GSS triggers the watchdog periodically; otherwise, the watchdog resets the PC.

The CNWS provides the communication between the CWPS and the GSS at the various gates, and vice versa. It transmits commands, data and compressed video images; the latter are transmitted only when specifically requested.

The main tasks of the CWPS are: Display of the planned and actual gate occupancy, display of the status of a docking process for the control center personnel, inputting gate configurations for a specific gate, inputting new aircraft models, data interchange with surrounding systems, for example maintenance, flightplan data, or planned gate occupancies.

The planned and the actual occupancy of gates may be displayed graphically at any time. The global picture can be split up into a number of smaller areas. One panel with all the gates occupied and the associated calling symbols is shown. The control center personnel can occupy a specific gate manually. Information about a specific gate and live video transmission may be selected. The planned data is shown in a specific block diagram. The planned occupancy may be changed or modified as required. The CWPS ensures that any change does not contravene gate restrictions, for example by aircraft types being assigned to a gate which is unsuitable for such aircraft types.

The main functionalities of the AuxS are to assist the specification of a gate, that is to say the coordinates of the central line or center line and the stopping position, aircraft types permissible for that gate, the specification of new aircraft models, and displaying the repetition of recorded docking sequences for evaluation.

These functionalities may be carried out at a separate workstation. The data transmission from and to these functions is carried out by means of a disk or some other medium, depending on the required capacity.

Figure 15:
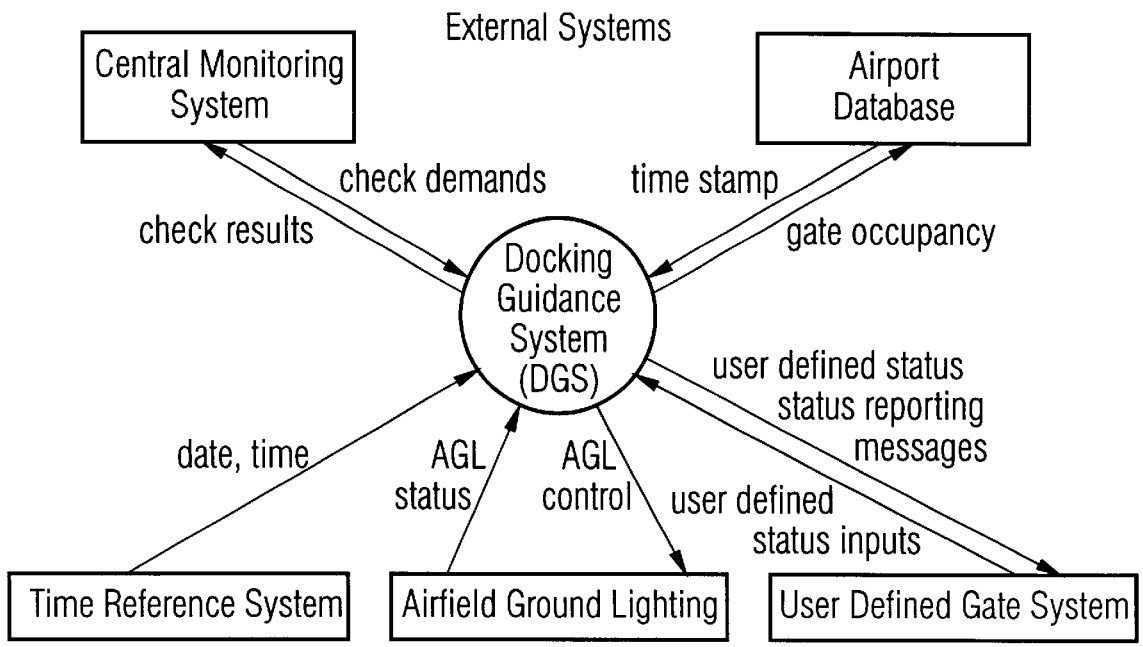
FIG. 15 shows a schematic overview of an arrangement of the docking guidance system according to the present invention in relation to other systems of an airport.

FIG. 15 shows a schematic overview of how a docking guidance system according to the present invention is arranged in relation to other systems of an airport, e.g., a time reference system, an airfield ground lighting system, a user defined gate system, an airport data base, and a central monitoring system.

The time reference system provides the docking guidance system with date and time information, as indicated by the arrow from the time reference system to the docking guidance system.

As indicated by the arrow from the airfield ground lighting system to the docking guidance system, the airfield ground lighting system sends signals regarding the status of lighting equipment for the airfield ground to the docking guidance system. The docking guidance system processes these status signals together with data from the other airport systems shown in FIG. 15 and forwards, as a result, signals to the airfield ground lighting system in order to control the lighting equipment for the airfield ground. For example, if an aircraft is docked at a particular gate, the lighting equipment of the airfield ground is controlled in such a way that other aircraft, which have just landed and need to be docked at a gate, for example, are not guided to the particular gate that is currently occupied. In other words, the lighting equipment is controlled such that the particular gate, at which the aircraft is docked, is closed for other aircraft that are taxiing from the runway to a parking position in accordance with and/or in response to route prescribed by the control tower of the airport.

The user defined gate system and the docking guidance system exchange user defined input data and reporting messages regarding the status of the gate system, as indicated by the arrows between the user defined gate system and the docking guidance system.

The airport database provides the docking guidance system with information regarding the current status of the gates, e.g., whether or not a particular gate is currently occupied by an aircraft that has docked at the particular gate. In the reverse direction, the docking guidance system provides the airport database with a time stamp so that the gate status information can be associated with date and time information, for example.

The central monitoring system checks the overall operation of the docking guidance system by sending check demands to the docking guidance system and by receiving check results from the docking guidance system.

Figure 16:
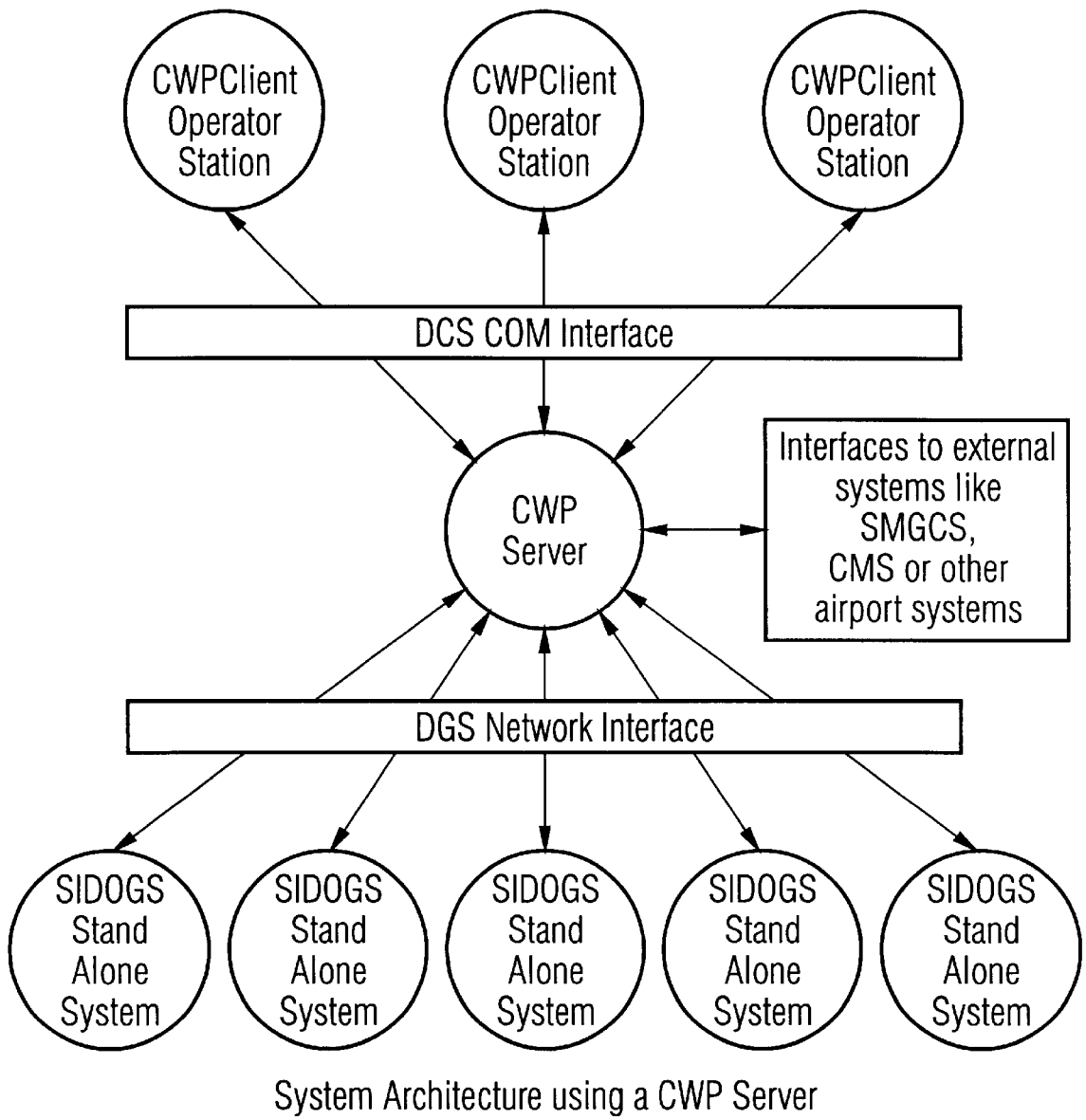
FIG. 16 shows a software structure of the docking guidance system according to the present invention configured for large airports having multiple terminals.

FIG. 16 shows a software structure of the docking guidance system (DGS) according to the present invention as it is preferably configured for large airports having multiple terminals. The system architecture is designed as a star configuration whose center includes a server for a central control device (CWP). Preferably, more than one CWP server is provided so that the docking guidance system functions reliably even if one of the CWP servers fails.

The CWP server is connected to a plurality of CWP clients via a DGS communications interface. These CWP clients are software packets, e.g., for operator stations for respective airport terminals or, in the case of large terminals, for parts of the terminals themselves. The operator stations may be computers or simply operator displays together with keyboards. The CWP clients are arranged in the computer network of the airport and control user interfaces of computers of a controller. The CWP clients execute inputs of the controller, messages from docking guidance subsystems associated with each gate, etc. Moreover, the CWP operator stations may receive data from a flight information system.

In addition, the CWP server is connected to the gates via a DGS network interface. These gates are, for example, associated with stand alone systems proposed by Siemens AG, such as Siemens Docking Guidance Systems (SIDOGS). These stand alone systems are described in more detail below in connection with FIG. 20.

Furthermore, the CWP server is connected to interfaces to external systems, such as a surface movement guidance and control system (SMGCS), a central monitoring system (CMS), or other airport systems.

Figure 17:
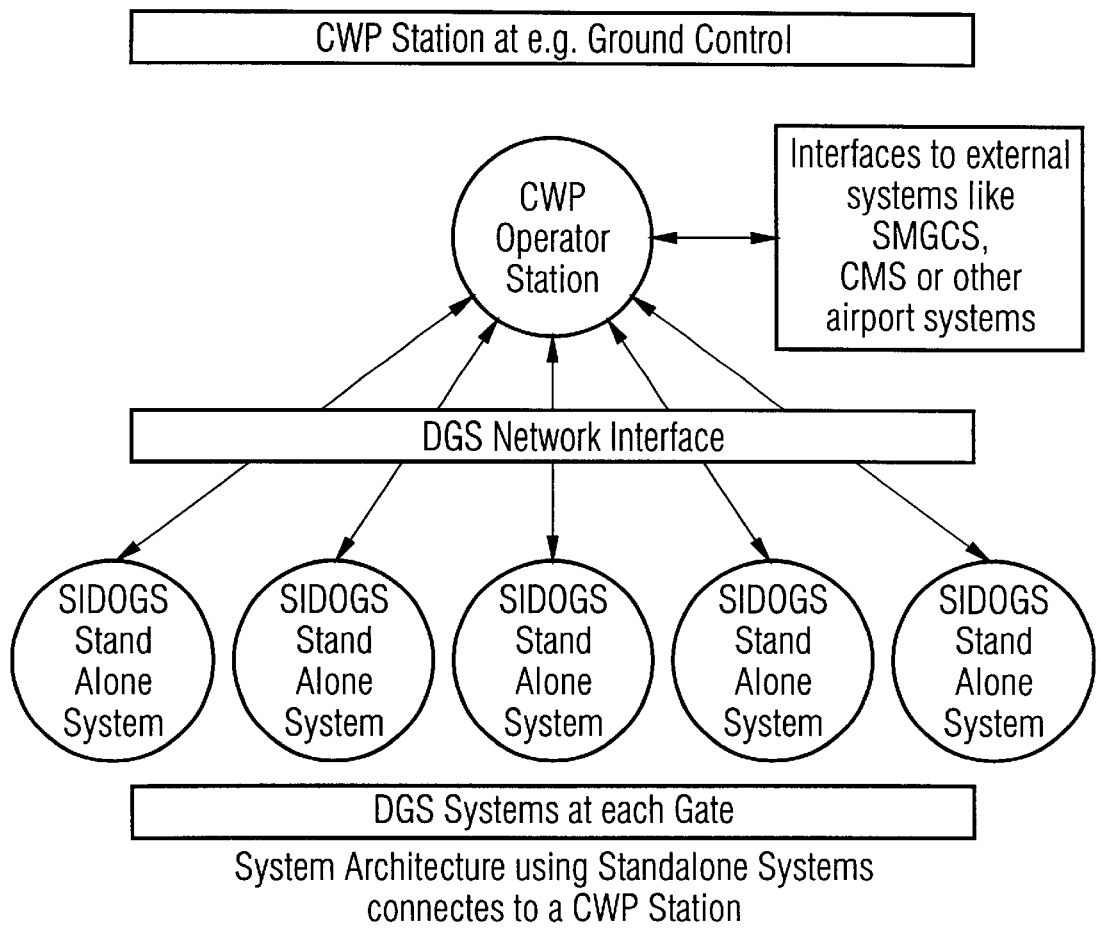
FIG. 17 shows a software structure of the docking guidance system according to the present invention configured for mid-sized airports.

FIG. 17 shows a software structure of the docking guidance system (DGS) according to the present invention as it is preferably configured for mid-sized airports. In this preferred embodiment of the docking guidance system according to the invention, the SIDOGS stand alone systems are connected to one CWP operator station via the DGS network interface. The CWP operator station is arranged at a ground control station, for example, and is connected to interfaces to external systems, such as a surface movement guidance and control system (SMGCS), a central monitoring system (CMS), or other airport systems. The CWP may be connected to the ground control station so that both docking information and ground control information can be displayed on the same display of a ground control station operator, for example. Thus, both the taxiing process of aircraft on the airfield ground and the docking process of aircraft at respective gates may be monitored and controlled by the ground control station. Furthermore, the CWP operator station may receive data from a flight information system.

Figure 18:
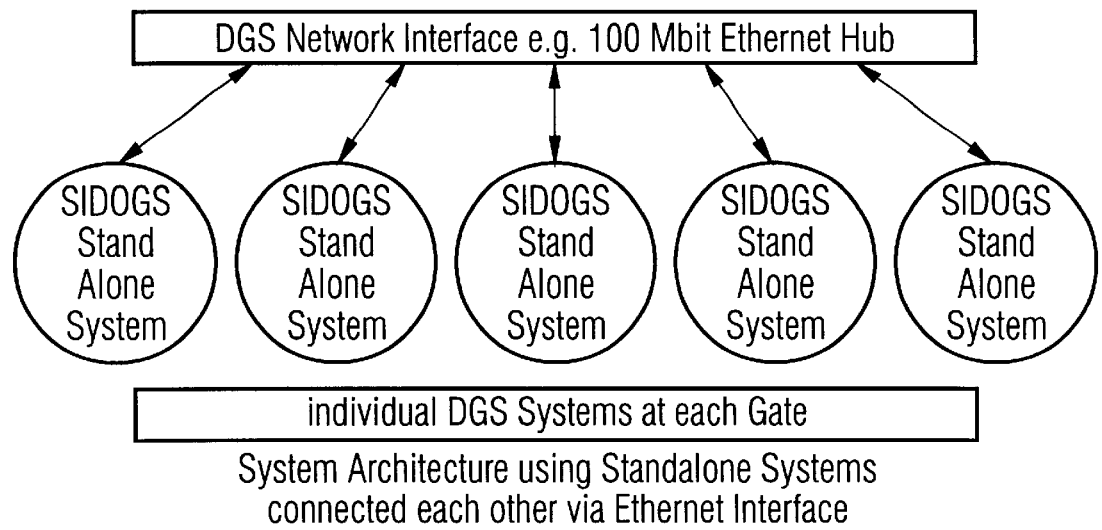
FIG. 18 shows a software structure of the docking guidance system according to the present invention configured for small airports.

FIG. 18 depicts a software structure of the docking guidance system (DGS) according to the present invention as it is preferably configured for small airports. Here, the SIDOGS stand alone systems are directly connected to each other via the DGS network interface, which is a 100 Mbit Ethernet Hub, for example. In such an arrangement, the guidance of an aircraft to a parking position at a particular gate may be carried out by a neighbor gate of the particular gate.

The software structures described above may be differently designed in accordance with the desires and requirements of the airport operator. In particular, the size of the airport, cost considerations, safety concerns, efficiency requirements, etc. determine the specific software structure of a docking guidance system for a particular airport.

Figure 19:
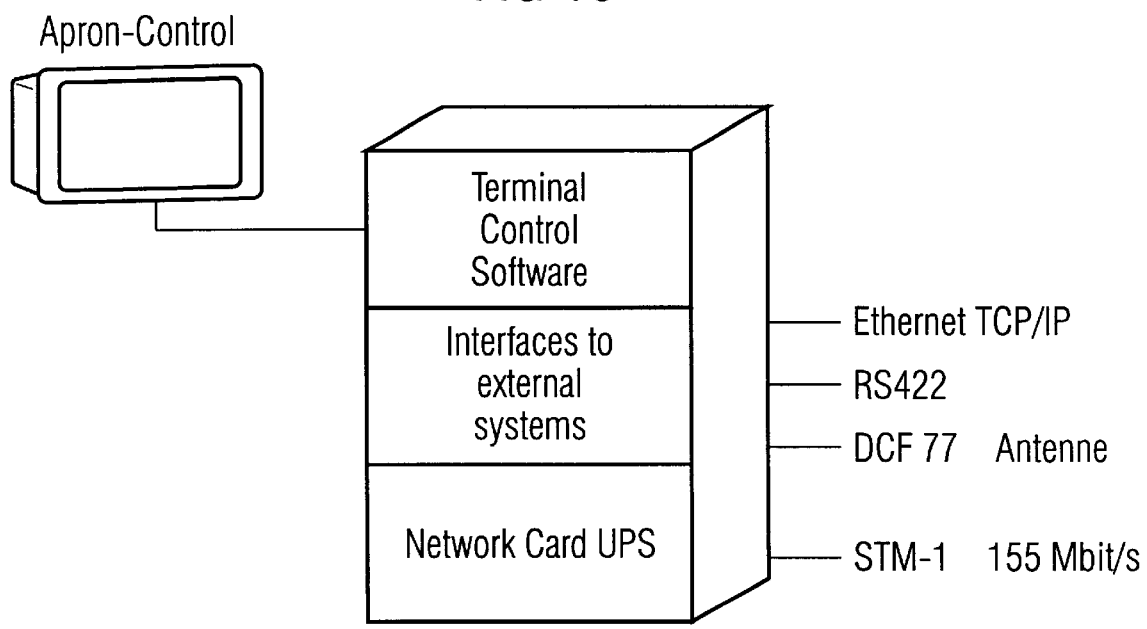
FIG. 19 shows a preferred architecture of a central control device of the docking guidance system according to the present invention.

FIG. 19 shows a preferred architecture of the central control device of the docking guidance system according to the present invention. This preferred architecture includes software to control the terminals of an airport; interfaces to external systems, such as those shown in FIG. 15; a network card for communicating with the network of the docking guidance system; and an uninterruptable power system (UPS) to ensure uninterrupted power supply to the central control device. The interfaces to the external systems include, for example, an Ethernet interface or a TCP/IP interface, an RS 422 interface, or an antenna. The network card of the central control device is provided to communicate with a synchronous transmission mode type network having a data rate of 155 Mbit/s, for example. Furthermore, the central control device is connected to a control system for the apron of an airport. Thereby, relevant data regarding the status of the apron, for example, are incorporated into the docking guidance system. This results in improved efficiency and improved safety of the docking process of aircraft, for example. Furthermore, by connecting the CWP with the apron control station, both docking information and apron control information can be displayed on the same display of an apron control station operator, for example. Thus, both the taxiing process of aircraft on the apron of the airport and the docking process of aircraft at respective gates may be monitored and controlled by the apron control station.

Figure 20:
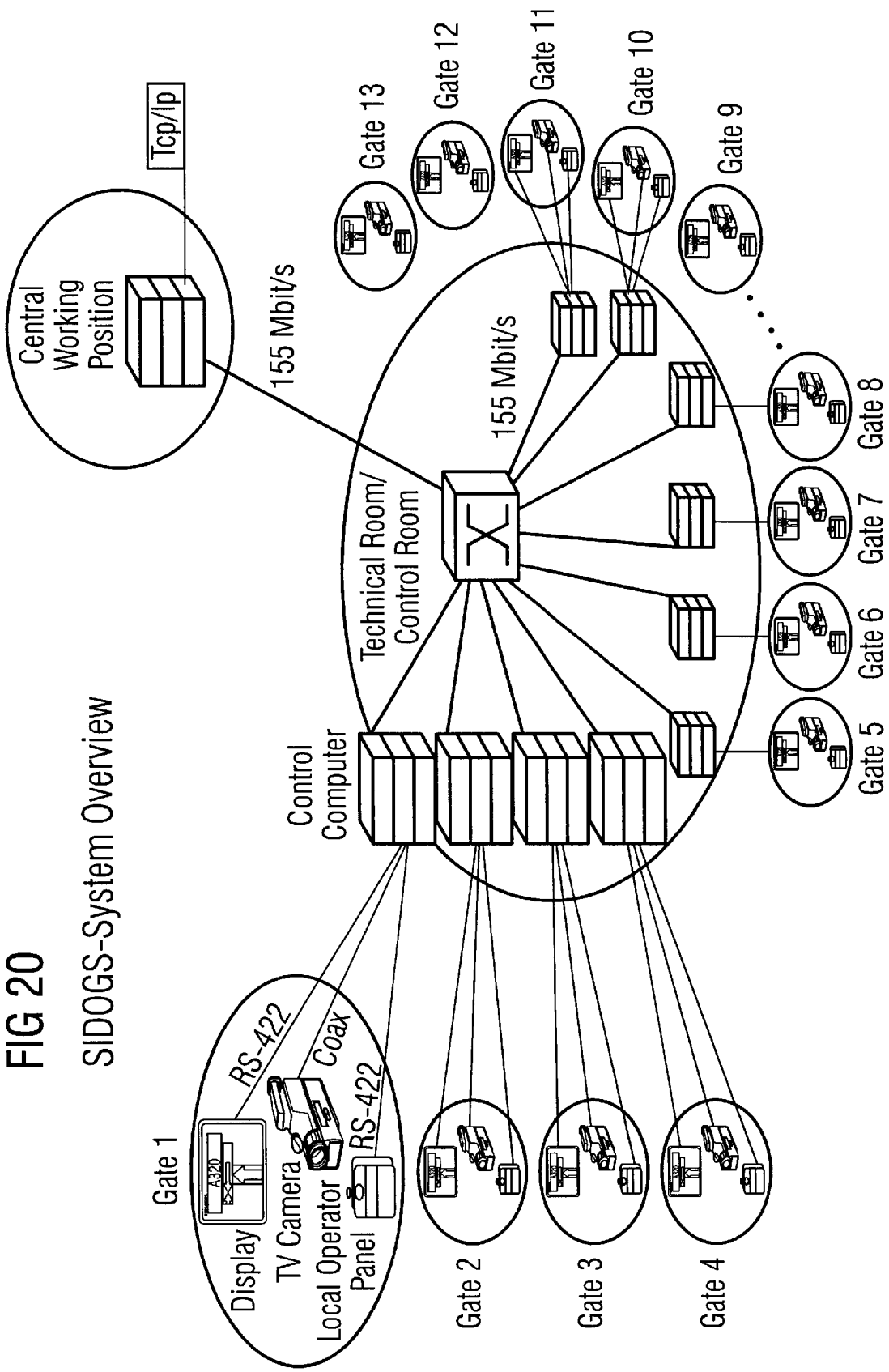
FIG. 20 shows an overview of a preferred embodiment of a Siemens Docking Guidance System (SIDOGS)

FIG. 20 shows an overview of a preferred embodiment of the Siemens Docking Guidance System (SIDOGS). In this embodiment, each of gates 1 to 13 is associated with a docking guidance subsystem. These docking guidance subsystems are interconnected via a network having a data rate of 155 Mbit/s, for example. A particular docking guidance subsystem includes a control computer, which is connected to and controls the operation of a display, a TV camera, and a Local Operator Panel, as shown in an exemplary manner for gate 1. The entire arrangement including the network and the gates, together with their respective docking guidance subsystems, is connected to a central working position or central control device, which monitors and controls the entire SIDOGS system.

The display includes information that indicates to the pilot of an aircraft approaching the respective gate in which direction(s) the aircraft should be moved in order to reach its final parking position at the gate. More specifically, the vertical arrow on the display indicates the distance the aircraft can or should be moved forward. The horizontal arrow on the display indicates where the aircraft should be moved laterally. Since the final parking position depends on the type of aircraft, the display also indicates the aircraft type recognized by the docking guidance subsystem, e.g., A320. In this way, the pilot is able to check whether the correct aircraft type has been recognized.

In a preferred embodiment of the display, the vertical arrow reduces its size as the pilot moves the aircraft forward. The lateral movement of the aircraft may be indicated to the pilot by two horizontal arrows, which face each other. If the pilot moves the aircraft laterally, these two arrows move accordingly on the display. In the exemplary situation shown on the display of gate 1 in FIG. 20, the pilot needs to move the aircraft forward and further to the right in order to reach the final parking position. As long as the point, at which the two tips of the horizontal arrows touch each other, lies off-centered with regard to the tip of the vertical arrow, the pilot must adjust the lateral position of the aircraft accordingly. Once this point lies precisely above the tip of the vertical arrow, the aircraft has reached the correct lateral coordinate of the final parking position. The pilot can now move the aircraft straight ahead so that the vertical arrow becomes shorter and shorter until it finally disappears. At that point, the aircraft has reached its final parking position.

The display may be located in the vicinity of the gate so that the pilot watches the display through the windshield of the aircraft's cockpit. Alternatively, the display information may be transmitted into the cockpit via a wireless link. In this case, the pilot monitors the movement of the aircraft on a display located in the cockpit.

The TV camera delivers information regarding the type and movement of the aircraft to the control computer, as described earlier in connection with FIGS. 1 and 2, in order to update the information on the display.

Should the network fail, the docking guidance subsystem for each gate is manually operated by the respective local operator panel.

Figure 21:
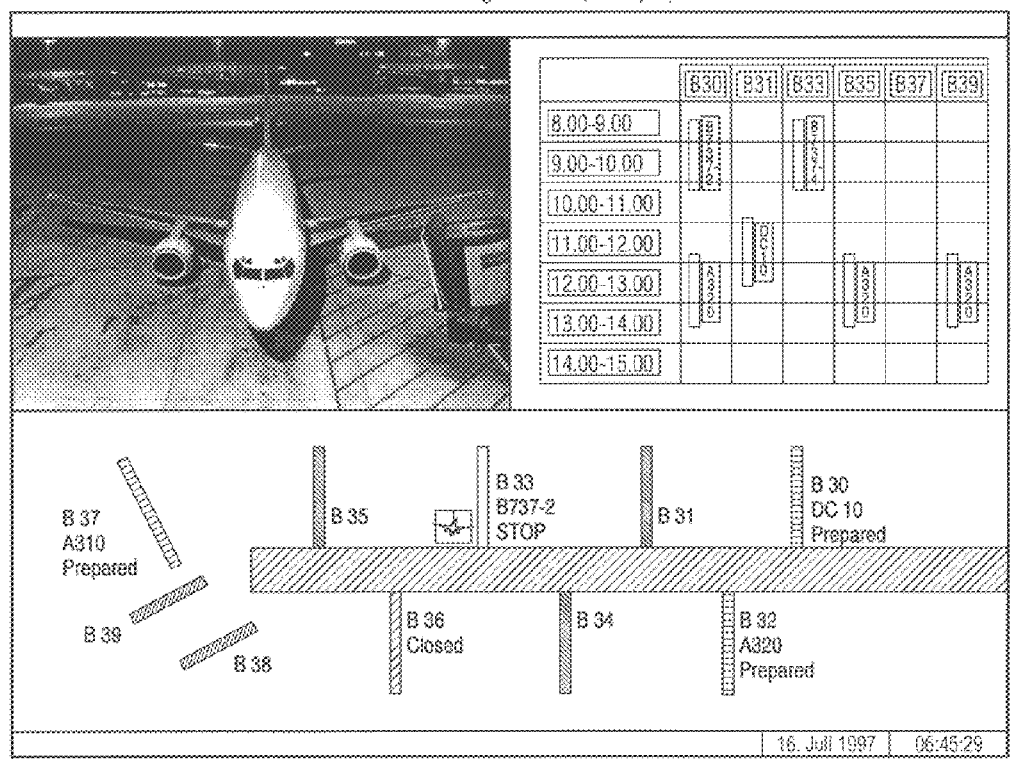
FIG. 21 shows an exemplary screen display of a central control device of the SIDOGS of FIG. 20.

FIG. 21 shows an exemplary screen display of the central working position or central control device of FIG. 20. This screen display, as well as other screen displays used in the docking guidance system according to the present invention, may be a black-and-white display or a color display. A screen section in the upper right corner shows a live video display of the aircraft approaching the gate. The video display is provided by the TV camera of FIG. 20, for example. Thereby, an operator is able to monitor the actual docking process of the aircraft.

A screen section in the upper left corner displays schedule information for individual gates, i.e., which aircraft type is scheduled to be docked at which gate for which time of the day. For example, as shown in FIG. 21, an aircraft of the B737-2 type is scheduled to be docked at gate B30 approximately between 8:30 and 10:15.

A lower section of the screen display of FIG. 21 shows a schematic overview of the gate arrangement of a particular airport and what the current status of the gates is. For example, gate B36 is closed, as shown in FIG. 21. In addition, this screen section indicates which aircraft type is docked at which gate and what the current status of the respective gate is, e.g., "prepared", "stop", or "closed". In a "prepared" status, the gate is ready for docking an aircraft, for example. In a "stop" status, the gate is currently occupied by an aircraft docked at the gate, for example. In a "closed" status, the gate is simply closed for operation.

FIG. 22 represents a preferred calibration system for calibrating the angular field and/or position of the TV camera or video camera of the docking guidance system according to the present invention. If the camera is not calibrated, the camera will, e.g. over time, deliver erroneous information as to the current position of an aircraft approaching the respective gate. This, in turn, results in erroneous information on the respective display shown in FIG. 20, so that the pilot is unable to properly guide the aircraft to its parking position.

The SIDOGS system has the following functionalities. First, access to the system is protected by passwords. Furthermore, several operator terminals may be arranged in the network of the system and different authorizations can be granted to the users of the system. In addition, interactions of the system operators with the system can be logged and error messages may be printed on the operator screens or on an alarm printer. Messages regarding the status of a selected gate are exchanged in the system and a live video picture delivered by the TV camera or the video camera is displayed in the control room of the system.

Since SIDOGS includes a schedule system as described above, the docking process for aircraft can be started automatically at a scheduled time. The network connections to the gate computers are automatically tested and a graphical user interface is provided for installing new gates, i.e., for integrating monitoring and control functions for docking guidance subsystems associated with additional gates into the software of the docking guidance system. For troubleshooting purposes, test programs may be executed and, if there is an emergency situation, the system operator may trigger an emergency stop of the system. Finally, the docking process may be manually started by the operator, if necessary or desired.

Since the SIDOGS operating system is based on the well-known Windows (NT) software, the SIDOGS system has the advantage that no special training for maintenance personnel is necessary. In addition, since the interfaces to the external systems are open interfaces, the external systems are easily connected to the SIDOGS system. SIDOGS can be remotely accessed via a modem in order to carry out maintenance duties, for example. Finally, it is a further advantage of the SIDOGS system that additional gates can be easily integrated into the system.

The process of docking an aircraft at a gate is carried out in the following exemplary manner. First, the operator of the SIDOGS system selects the gate at which an approaching aircraft is to be docked. Second, the type of the approaching aircraft is manually or automatically selected at either the Gate Operator Panel (GOP) of the respective gate or at the control center of the system. Subsequently, video data of the aircraft approaching the gate, which are detected by the TV camera or the video camera of the respective gate, are transmitted to the control center. If necessary, the operator in the control center can influence the docking process at any time. For example, in case of an emergency situation, the system operator is capable of issuing an "emergency stop" signal, which will halt the docking process in progress. Finally, status messages of the docking process are transmitted to the control center, in accordance with which the docking process is monitored and controlled.

The processing of the video data, e.g., gray tone images of the aircraft approaching the gate, at which it is to be docked, is described in more detail in connection with FIGS. 1 to 4 above. These gray tone images are supplied to an evaluation unit. In a first step, the evaluation unit filters the gray tone images to recognize edges in the image. Subsequently, filtering in the time domain is used to extract edges which move over time so that moving objects can be distinguished from stationary objects. Certain outlines of the aircraft are then compared with templates previously stored in the evaluation unit. Thereby, the aircraft type and the current position of the aircraft are recognized by the evaluation unit. The resulting data are forwarded to the display, which is arranged outside the aircraft and/or inside the aircraft, based on which the pilot moves the aircraft such that it finally reaches its final parking position.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A docking system for airport terminals, comprising:
   a central control device;
   a communication network; and
   a docking station subsystem per gate connected via the communication network to the central control device; the docking station subsystem having
      an airfield situation monitoring and processing segment,
      at least one advisor and guidance display segment,
      a data and status handler segment having at least one video camera for each center line of the gate,
      at least one gate operator panel segment, and
      an auxiliary subsystem connected to the docking station subsystem to enter information relating to aircraft models and the gate into the docking station subsystem.

2. The docking system as claimed in claim 1 wherein the docking station subsystem comprises the advisor and guidance display segment for each center line of its gate.

3. The docking system as claimed in claim 1 wherein each of the advisor and guidance display segments has a microprocessor which controls display elements and converts display commands into displays.

4. The docking system as claimed in claim 1 wherein the data and status handler segment runs on the same hardware as the airfield situation monitoring and processing segment, which provides communication between the docking station subsystem and the central control device via the communication network, and coordinates processes within the docking station subsystem.

5. The docking system as claimed in claim 1 wherein the data and status handler segment and the airfield situation monitoring and processing segment are arranged in one housing.

6. The docking system as claimed in claim 5 wherein the data and status handler segment and the airfield situation monitoring and processing segment run on a hardware basis comprising a PC motherboard and video signal processing equipment.

7. The docking system as claimed in claim 5 wherein the advisor and guidance display segment is also arranged in the housing.

8. The docking system as claimed in claim 1 wherein the docking station subsystem is designed such that the docking station subsystem allows the advisor and guidance displays to be transmitted to a screen in the cockpit of the aircraft.

9. The docking system as claimed in claim 1 wherein the airfield situation monitoring and processing segment is arranged in a housing together with the video camera.

10. The docking system as claimed in claim 9 wherein a digital signal processor is provided for transmission of data between the airfield situation monitoring and processing segment and the data and status handler segment.

11. The docking system as claimed in claim 1 wherein the auxiliary subsystem comprises:

an aircraft model output;

a gate installation planner;

a calibration unit; and a validation and diagnosis tool.

12. The docking system as claimed in claim 1 wherein the communication network is a high-speed network using an asynchronous transmission mode ATM for transmitting originally digital signals and originally analog signals converted into digital signals.

13. The docking system as claimed in claim 12 wherein the digital signals are video signals.

14. The docking system as claimed in claim 12 wherein the ATM high-speed network comprises at least one network adapter in the form of a SICAN-ATMax 155-PM2.

15. The docking system as claimed in claim 1 wherein the docking station subsystem is systematically broken down into a ground area monitoring and processing segment, a gate area control segment, a gate schedule segment and a gate data handler segment.

16. The docking system as claimed in claim 15 wherein the ground area monitoring and processing segment comprises an airfield monitor and an airfield situation processor connected by an interface to the gate schedule segment.

17. The docking system as claimed in claim 15 wherein the gate area control segment comprises:

an airfield ground lighting system;

an advisor and guidance display;

a ground operator panel;

a luxometer; and a gate area processor which runs on a PC platform to which the airfield ground lighting system, the advisor and guidance display, the ground operator panel and the luxometer are connected, and which is connected by an interface to the gate schedule segment.

18. The docking system as claimed in claim 15 wherein the gate data handler segment comprises a calibration support and a static data handler, each of which being connected to the gate schedule segment by an interface and running on a PC platform.

19. The docking system as claimed in claim 15 wherein the gate schedule segment comprises a gate management and a watchdog.

20. The docking system as claimed in claim 1, comprising:

a video device that detects an aircraft and outputs detection data;

a data storage location that stores a plurality of template sets, each template set corresponding to one of a plurality of different aircraft types and including at least three stored profiles corresponding to the one aircraft type; and an evaluation unit that receives the detection data, generates actual feature profiles from the detection data, and compares the actual feature profiles with the stored profiles, for each of the template sets, to produce an evaluation result.

21. The docking system as claimed in claim 20 wherein each template set contains five stored profiles for each aircraft type.

22. The docking system as claimed in claim 20 wherein the profiles include data relating to at least one of a template or an outline section corresponding to the one aircraft type.

23. The docking system as claimed in claim 20 wherein the detection data includes data relating to at least one of a form of the aircraft and movement of the aircraft.

24. The docking system as claimed in claim 20 wherein trajectories of the actual feature profiles are used as a basis to determine the present position of the aircraft.

25. The docking system as claimed in claim 20 wherein the video device is a monochrome camera.

26. The docking system as claimed in claim 20 wherein the video device has an objective focal length of 16 mm.

27. The docking system as claimed in claim 20 wherein the video device has an objective focal length of 25 mm.

28. The docking system as claimed in claim 20 wherein the video device is approximately aligned with a center line of the gate.

29. The docking system as claimed in claim 28 wherein the video device is approximately aligned with the center line of the gate at a height of approximately 9 m.

30. The docking system as claimed in claim 20 wherein a sequence of individual gray tone images is read into the evaluation unit that are spatially filtered in order to extract gray tone edges, and that are filtered in the time domain in order to produce moving images used to produce a mask to define areas for subsequent segmentation.

31. The docking system as claimed in claim 30 wherein the evaluation unit comprises a Sobel filter to spatially filter the individual gray tone images, and to filter the gray tone images in the time domain.

* * * * *